US012603299B2

(12) United States Patent
Delaporte et al.

(10) Patent No.: US 12,603,299 B2
(45) Date of Patent: Apr. 14, 2026

(54) CELLULOSE-BASED SELF-STANDING FILMS FOR USE IN Li-ION BATTERIES

(71) Applicant: HYDRO-QUÉBEC, Montréal (CA)

(72) Inventors: Nicolas Delaporte, Montréal (CA); Abdelbast Guerfi, Brossard (CA); Karim Zaghib, Longueuil (CA)

(73) Assignee: HYDRO-QUÉBEC, Montreal (CA)

( * ) Notice: Subject to any disclaimer, the term of this patent is extended or adjusted under 35 U.S.C. 154(b) by 403 days.

(21) Appl. No.: 18/491,279

(22) Filed: Oct. 20, 2023

(65) Prior Publication Data

US 2024/0063400 A1 Feb. 22, 2024

Related U.S. Application Data

(63) Continuation of application No. 17/048,717, filed as application No. PCT/CA2019/050657 on May 15, 2019, now Pat. No. 11,811,068.

(Continued)

(51) Int. Cl.
*H01M 4/80* (2006.01)
*H01M 4/02* (2006.01)
(Continued)

(52) U.S. Cl.
CPC .......... *H01M 4/806* (2013.01); *H01M 4/131* (2013.01); *H01M 4/136* (2013.01);
(Continued)

(58) Field of Classification Search
CPC .................................................. H01M 4/806
See application file for complete search history.

(56) References Cited

U.S. PATENT DOCUMENTS 8,227,117 B2 7/2012 Hampden-Smith et al.
9,876,230 B2 1/2018 George et al.
(Continued)

FOREIGN PATENT DOCUMENTS

CA 2985660 A1 12/2016
EP 2830126 A1 1/2015
(Continued)

OTHER PUBLICATIONS

Office Action dated Jul. 3, 2024, for Korean Patent Application No. 10-2020-7034427.

(Continued)

*Primary Examiner* — Stephan J Essex
(74) *Attorney, Agent, or Firm* — Womble Bond Dickinson (US) LLP

(57) ABSTRACT

The present technology relates to self-standing electrodes, their use in electrochemical cells, and their production processes using a water-based filtration process. For example, the self-standing electrodes may be used in lithium-ion batteries (LIBs). Particularly, the self-standing electrodes comprise a first electronically conductive material serving as a current collector, the surface of the first electronically conductive material being grafted with a hydrophilic group, a binder comprising cellulose fibres, an electrochemically active material, and optionally a second electronically conductive material. A process for the preparation of the self-standing electrodes is also described.

23 Claims, 15 Drawing Sheets

Related U.S. Application Data

(60) Provisional application No. 62/728,301, filed on Sep. 7, 2018, provisional application No. 62/671,612, filed on May 15, 2018.

(51) Int. Cl.

| | |
|---|---|
| ***H01M 4/131*** | (2010.01) |
| ***H01M 4/136*** | (2010.01) |
| ***H01M 4/1391*** | (2010.01) |
| ***H01M 4/1397*** | (2010.01) |
| ***H01M 4/62*** | (2006.01) |
| ***H01M 4/66*** | (2006.01) |
| ***H01M 10/0525*** | (2010.01) |
| ***H01M 10/054*** | (2010.01) |

(52) U.S. Cl.

CPC ....... *H01M 4/1391* (2013.01); *H01M 4/1397* (2013.01); *H01M 4/621* (2013.01); *H01M 4/663* (2013.01); *H01M 4/667* (2013.01); *H01M 10/0525* (2013.01); *H01M 10/054* (2013.01); *H01M 2004/027* (2013.01); *H01M 2004/028* (2013.01)

(56) References Cited

U.S. PATENT DOCUMENTS

| | | | |
|---|---|---|---|
| 10,003,075 | B2 | 6/2018 | Maheshwari et al. |
| 10,593,911 | B2 | 3/2020 | Weinstein et al. |
| 2018/0182566 | A1 | 6/2018 | Brousse et al. |

FOREIGN PATENT DOCUMENTS

| | | | | |
|---|---|---|---|---|
| FR | 3038145 A1 | 12/2016 | | |
| JP | 2007-280657 A | 10/2007 | | |
| JP | 2007-535787 A | 12/2007 | | |
| JP | 2016-004786 A | 1/2016 | | |
| JP | 2017-152337 A | 8/2017 | | |
| JP | 2017-521841 A | 8/2017 | | |
| JP | 2017-228456 A | 12/2017 | | |
| KR | 20030091977 A | 12/2003 | | |
| WO | 2012035217 A1 | 3/2012 | | |
| WO | 2016187699 | 12/2016 | | |
| WO | WO-2016187699 A1 * | 12/2016 | ............ | H01M 4/366 |

OTHER PUBLICATIONS

Cao et al., "Integrated Fast Assembly of Free-Standing Lithium Titanate/Carbon Nanotube/Cellulose Nanofiber Hybrid Network Film as Flexible Paper-Electrode for Lithium-Ion Batteries", ACS Applied Materials & Interfaces, 2015, vol. 7, No. 20, pp. 10695-10701.

Office Action (Notice of Reasons for Rejection) issued on Feb. 22, 2023, by the Japanese Patent Office in corresponding Japanese Patent Application No. 2020-563789, and an English Translation of the Office Action. (4 pages).

Office Action (First Examination Report) issued on Aug. 30, 2022, by the Intellectual Property India, Government of India in corresponding Indian Patent Application No. 202017046823, and an English Translation of the Office Action. (5 pages).

Extended European Search Report dated Feb. 2, 2022, issued by the European Patent Office in corresponding European Application No. 19802496.0-1108, (16 pages).

Hu, L. et al., "Highly conductive paper for energy-storage devices" Proceedings of the National Academy of Sciences, vol. 106, No. 51, (2009), pp. 21490-21494.

Hu, L. et al., "Printed energy storage devices by integration of electrodes and separators into single sheets of paper" Applied Physics Letters, vol. 96, No. 18,(2010), pp. 183502-1-183502-3.

Hu, L. et al., "Lithium-Ion Textile Batteries with Large Areal Mass Loading" Advanced Energy Materials, vol. 1. No. 6, (2011), pp. 1012-1017.

Nyström, G. et al."A Nanocellulose Polypyrrole Composite Based on Microfibrillated Cellulose from Wood" The Journal of Physical Chemistry B, vol. 114, No. 12, (2010), pp. 4178-4182.

Pushparaj, V. L. et al.,"Flexible energy storage devices based on nanocomposite paper" Proceedings of the National Academy of Sciences, vol. 104, No. 34, (2007), pp. 13574-13577.

Jabbour, L. et al., "Flexible cellulose/LiFePO4 paper-cathodes: toward eco-friendly all-paper Li-ion batteries" Cellulose, vol. 20, No. 1, (2013), pp. 571-582.

Anderson, R.E. et al., "Multifunctional single-walled carbon nanotube-cellulose composite paper" Journal of Materials Chemistry, vol. 20, No. 12, (2010), pp. 2400-2407.

Hubbe, M.A. et al.,"Charge-Related Measurements—A Reappraisal. Part 2: Fibre-Pad Streaming Potential" Paper Technol, vol. 45, No. 9, (2004), pp. 27-34.

Jabbour, L. et al., Microfibrillated cellulose-graphite nanocomposites for highly flexible paper-like Li-ion battery electrodes, Journal of Materials Chemistry, vol. 20, No. 35, (2010), pp. 7344-7347.

Jabbour, L. et al.,"Aqueous processing of cellulose based paper-anodes for flexible Li-ion batteries" Journal of Materials Chemistry, Journal of Materials Chemistry, vol. 22, No. 7, (2012), pp. 3227-3233.

Jabbour, L. et al., Cellulose-based Li-ion batteries: a review: Cellulose, vol. 20, No. 4, (2013), pp. 1523-1545.

Zhang, S.S. et al.,"Aluminum corrosion in electrolyte of Li-ion battery" Journal of Power Sources, vol. 109, No. 2, (2002), pp. 458-464.

Wood, D.L. et al., "Prospects for reducing the processing cost of lithium ion batteries" Journal of Power Sources, vol. 275, (2015), pp. 234-242.

Armand, M. et al.,"Building better batteries" Nature, vol. 451, (2008), pp. 652-657.

Tarascon J.M.,"Key challenges in future Li-battery research" Philosophical Transactions of the Royal Society A, vol. 368, (2010), pp. 3227-3241.

Chen, H. et al.,"From Biomass to a Renewable LixC6O6 Organic Electrode for Sustainable Li-ion Batteries" ChemSusChem: Chemistry & Sustainability Energy & Materials, vol. 1.4 (2008), pp. 348-355.

Sharma, P. et al.,"Perylene-polyimide-Based Organic Electrode Materials for Rechargeable Lithium Batteries" The Journal of Physical Chemistry Letters, vol. 4, No. 19 (2013), pp. 3192-3197.

Delaporte, N. et al.,"Increasing the Affinity Between Carbon-Coated LiFePO4/C Electrodes and Conventional Organic Electrolyte by Spontaneous Grafting of a Benzene-Trifluoromethylsulfonimide Moiety" ACS applied materials & interfaces, vol. 7, No, (33), 2015, pp. 18519-18529.

Zaghib, K. et al.,"Electrochemical and thermal characterization of lithium titanate spinel anode in CeliFePO4//CeLi4Ti5O12 cells at sub-zero temperatures" Journal of Power Sources, vol. 248, (2014), pp. 1050-1057.

Zaghib, K. et al.,"Electrochemical study of Li Ti O as negative electrode for Li-ion 4 5 12 polymer rechargeable batteries" Journal of Power Sources, (1999), vol. 81-82, pp. 300-305.

Yang, X.F. et al.,"Hollow Melon-Seed-Shaped Lithium Iron Phosphate Microand Sub-Micrometer Plates for Lithium-Ion Batteries" ChemSusChem, (2014), vol. 7, No. (6), pp. 1618-1622.

Lux, S.F. et al.,"Low Cost, Environmentally Benign Binders for Lithium-Ion Batteries" Journal of the Electrochemical Society, (2010), vol. 157, No. 3, pp. A320-A325.

Belanger, D. et al.,"Electrografting: a powerful method for surface modification" Chemical Society Reviews, vol. 40, No. 7, (2011), pp. 3995-4048.

Zaghib, K. et al."Aging of LifePO4 upon exposure to H2O" Journal of Power Sources, vol. 185, No. 2 , (2008), pp. 698-710.

Martin, J.F. et al.,"Air Exposure Effect on LiFePO4" Electrochemical and Solid State Letters, vol. 11, No. 1, (2007), pp. A12-A16.

Martin, J.F. et al.,"More on the reactivity of olivine LiFePO4 nano-particles with atmosphere at moderate temperature" Journal of Power Sources, vol. 196, No. 4, (2011), pp. 2155-2163.

(56) References Cited

OTHER PUBLICATIONS

Ohzuku, T. et al.,"Zero-Strain Insertion Material of Li[Lil/3Tis/3]O4 for Rechargeable Lithium Cells " Journal of the Electrochemical Society, vol. 142, No. 5, (1995), 1431-1435.
Zaghib, K. et al.,"Electrochemistry of Anodes in Solid-State Li-Ion Polymer Batteries" Journal of the Electrochemical Society, vol. 145, No. 9, (1998), 3135-3140.
Yu, L. et al., "A Localized High-Concentration Electrolyte with Optimized Solvents and Lithium Difluoro(oxalate)borate Additive for Stable Lithium Metal Batteries" ACS Energy Letters, vol. 3, No. 9, (2018), pp. 2059-2067.
Han, X. et al.,"Aromatic Carbonyl Derivative Polymers as High-Performance Li-Ion Storage Materials" Advanced materials, vol. 19, No. 12, (2007), pp. 1616-1621.
Tenne, D.A. et al.,"Single crystals of the organic semiconductor perylene tetracarboxylic dianhydride studied by Raman spectroscopy" Physical Review B, vol. 61, No. 21, (2000), 14564-14569.
Wang, J. et al.,"Intrinsic factors attenuate the performance of anhydride organic cathode materials of lithium battery" Journal of Electroanalytical Chemistry, vol. 773, (2016), pp. 22-26.
Zhang, K. et al.,"High-Performance Organic Lithium Batteries with an Ether-Based Electrolyte and 9,10-Anthraquinone (AQ)/CMK-3 Cathode" Advanced Science, vol. 2, (2015), 1500018, 7 pages.
Xiang, J. et al.,"A Novel Coordination Polymer as Positive Electrode Material for Lithium Ion Battery" Crystal Growth and Design, vol. 8, No. 1, (2008), pp. 280-282.
Lv, M. et al.,"Heteroaromatic organic compound with conjugated multi-carbonyl as cathode material for rechargeable lithium batteries" Scientific reports, vol. 6, (2016), 23515, 8 pages.
Kumar, T.P. et al.,"Carbonaceous anode materials for lithium-ion batteries—the road ahead" Journal of the Indian Institute of Science, vol. 89, 4, (2012), pp. 393-424.
Yao, M. et al.,"5,7,12,14-Pentacenetetrone as a High-Capacity Organic PositiveElectrode Material for Use in Rechargeable Lithium Batteries" Int. J. Electrochem. Sci, vol. 6, (2011), pp. 2905-2911.
Geng, J. et al.,"Evaluation of polyketones with N-cyclic structure as electrode material for electrochemical energy storage: case of tetraketopiperazine unit" Energy Environmental Science, vol. 3, No. 12, (2010), pp. 1929-1933.
Le Gall, T. et al.,"Poly(2,5-dihydroxy-1,4-benzoquinone-3,6-methylene): a new organic polymer as positive electrode material for rechargeable lithium batteries" Journal of power sources, vol. 119, (2003), pp. 316-320.
Yao, M. et al.,"High-capacity organic positive-electrode material based on a benzoquinone derivative for use in rechargeable lithium batteries" Journal of Power Sources, vol. 195, No. 24, (2010), pp. 8336-8340.
Walker, W. et al.,"The effect of length and cis/trans relationship of conjugated pathway on secondary battery performance in organolithium electrodes" Electrochemistry communications, vol. 12, No. 10, (2010), pp. 1348-1351.
Wu, H. et al.,"An organic cathode material based on a polyimide/CNT nanocomposite for lithium ion batteries" Journal of Materials Chemistry A, vol. 1, No. 21, (2013), 6366-6372.
Song, Z. et al.,"Anthraquinone based polymer as high performance cathode material for rechargeable lithium batteriesw" Chemical communications , vol. 4, (2009), pp. 448-450.
Song, Z. et al.,"Polymer-Graphene Nanocomposites as Ultrafast-Charge and-Discharge Cathodes for Rechargeable Lithium Batteries" Nano letters, vol. 12, No. 5, (2012), pp. 2205-2211.
Delaporte N., et al., "Chemically grafted carbon-coated LiFePO4 using diazonium chemistry," Journal of Power Sources, vol. 280, pp. 246-255 (2015).
International Search Report (with English Translation) and Written Opinion issued in corresponding International Patent Application No. PCT/CA2019/050657, 9 pages (Aug. 1, 2019).

* cited by examiner

A

B

CELLULOSE-BASED SELF-STANDING FILMS FOR USE IN Li-ION BATTERIES

RELATED APPLICATIONS

This application is a continuation of U.S. application Ser. No. 17/048,717, filed Oct. 19, 2020, titled "CELLULOSE-BASED SELF-STANDING FILMS FOR USE IN LI-ION BATTERIES", now U.S. Pat. No. 11,811,068, issued Nov. 7, 2023, which is a U.S. National Phase Under 35 U.S.C. § 371 of International Application No. PCT/CA2019/050657, titled "CELLULOSE-BASED SELF-SUPPORTING FILMS FOR USE IN LI-ION BATTERIES," filed May 15, 2019, which claims priority under applicable law to U.S. Provisional Patent Application No. 62/671,612 filed on May 15, 2018, and U.S. Provisional Patent Application No. 62/728,301 filed on Sep. 7, 2018, the contents of which are incorporated herein by reference in their entirety and for all purposes.

TECHNICAL FIELD

The technical field generally relates to self-standing electrodes, their methods of production and their use in electrochemical cells, for example, in lithium-ion batteries.

BACKGROUND

Recent research in the field of lithium-ion batteries (LIBs) has mainly focused on reducing production costs and improving performance. New materials and environmentally friendly processes for producing LIBs have also been the subject of several studies.

In this context, the introduction of cellulose as a material for LIBs is very promising. For example, some studies have focused on the preparation of flexible electrodes for batteries and supercapacitors and involve the use of cellulose as a substrate (see Hu, L. et al., *Proceedings of the National Academy of Sciences* 106.51 (2009): 21490-21494; Hu, L. et al., *Applied Physics Letters* 96.18 (2010): 183502; and Hu, L. et al., *Advanced Energy Materials* 1.6 (2011): 1012-1017) or as a binder (see Nyström, G. et al. *The Journal of Physical Chemistry B* 114.12 (2010): 4178-4182; and Pushparaj, V. L. et al., *Proceedings of the National Academy of Sciences* 104.34 (2007): 13574-13577). However, the production processes always involve the use of organic solvents, synthetic binders, or expensive and not easily disposable materials (for example, carbon nanotubes (CNTs)). In addition, in most studies, the cellulose is modified and transformed to obtain shorter fibers or to modulate the zeta potential of the dispersion. As such, aluminum sulfate hydrate is often used as a flocculating agent prior to the addition of carbon (see Jabbour, L. et al., *Cellulose* 20.1 (2013): 571-582). Using this flocculating agent, aluminum cations are used to neutralize the negative charge present on the cellulose fibers (see Anderson, R. E. et al., *Journal of Materials Chemistry* 20.12 (2010): 2400-2407; and Hubbe, M. A., et al., *Paper Technol* 45.9 (2004): 27-34). However, this compound may further react inside the battery.

In recent studies, it was demonstrated that microfibrillated cellulose and highly refined cellulose fibers dispersed in water may be effectively used as a binder for the manufacture of self-standing negative electrodes with very good electrochemical and mechanical performances (see Jabbour, L. et al., *Journal of Materials Chemistry* 20.35 (2010): 7344-7347; and Jabbour, L. et al., *Journal of Materials Chemistry* 22.7 (2012): 3227-3233). However, chemical, enzymatic, and acid hydrolysis treatments are required in order to obtain fibers having a diameter of between 5 and 250 nm, thus increasing the costs and preparation time of self-standing films (see Jabbour, L. et al., *Cellulose* 20.4 (2013): 1523-1545).

Reducing the mass of the electrode is another concern of the LIBs industry. The self-standing electrodes become very interesting in this context since current collectors have a significant impact on the mass of the electrode. For example, an aluminum current collector represents at least 40% of the total mass of a lithium iron phosphate ($LiFePO_4$ or LFP) electrode with a loading of about 6 $mg/cm^2$ of active material. Replacing the mass of the aluminum current collector with lightweight current collectors comprising carbon and/or carbon fibers results in a more conductive film and better performance. In addition, the inactive metal current collector foils not only increase the overall weight of the cell but may also be affected by corrosion problems (see Zhang, S. S. et al., *Journal of Power Sources* 109.2 (2002): 458-464).

Efforts have also been made to reduce the production costs of LIBs. According to cost modeling, 50% of the price of LIBs comes from composite electrode materials and current collectors (see Wood, D. L. et al., *Journal of Power Sources* 275 (2015): 234-242). The authors also estimated the costs of dispersion in polyvinylidene fluoride (PVDF) to be 19 to 23 USD/kg compared to 0.5 to 1.4 USD/kg for carboxymethylcellulose (CMC).

Organic electrodes are also known to be good potential candidates for the next generation of LIBs (see Armand, M. et al., *Nature* 451 (2008): 652-657; and Tarascon J. M., *Philosophical Transactions of the Royal Society A* 368 (2010): 3227-3241). Organic electrodes could, for example, reduce battery manufacturing costs since organic materials may be prepared from natural products or biomass (see Chen, H. et al., *ChemSusChem: Chemistry & Sustainability Energy & Materials* 1.4 (2008): 348-355). In addition, due to the absence of inorganic structures and metals such as cobalt or nickel, batteries comprising organic materials may be more environmentally friendly and fully recyclable.

Accordingly, there is a need for self-standing electrodes excluding one or more of the disadvantages encountered with conventional electrodes. There is also a need for simpler and more efficient self-standing electrode manufacturing processes.

SUMMARY

According to one aspect, the present technology relates to a self-standing electrode comprising:

a first electronically conductive material serving as a current collector, the surface of said first electronically conductive material being grafted with at least one aryl group of Formula I:

Formula I

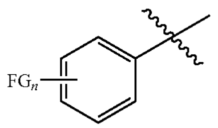

wherein:

FG is a hydrophilic functional group; and n is an integer in the range of 1 to 5, preferably n is in the range of 1 to 3, preferably n is 1 or 2, or more preferably n is 1;

a binder comprising cellulose fibers; and an electrochemically active material;

wherein, the self-standing electrode is made of a solid film having a first and a second surfaces;

the concentration of the first electronically conductive material increases from the second surface to the first surface of the solid film; and the concentration of the electrochemically active material increases from the first surface to the second surface of the solid film.

In one embodiment, the self-standing electrode as defined herein further comprises a second electronically conductive material, the concentration of said second electronically conductive material increasing from the first surface to the second surface of the solid film.

In another embodiment, the first electronically conductive material comprises carbon fibers. For example, the carbon fibers are vapor grown carbon fibers (VGCFs).

In another embodiment, the cellulose fibers are unmodified cellulose fibers. For example, the average length of the cellulose fibers is between 5 nm and 5 mm, or between 250 nm and 3 mm, or between 500 nm and 3 mm, or between 1 μm and 3 mm, or between 100 μm and 3 mm, or between 250 μm and 3 mm, or between 500 μm and 3 mm, or between 750 μm and 2.5 mm, or between 1 mm and 2.5 mm.

In another embodiment, the electrochemically active material is in the form of particles coated with a carbon layer in a core-shell configuration. For example, said carbon layer may be grafted with at least one aryl group of Formula I.

In another embodiment, the electrochemically active material is selected from metal oxide particles, lithiated metal oxide particles, metal phosphate particles, lithiated metal phosphate particles, carbon-based materials, and active organic materials. For example, the metal is a transition metal selected from titanium (Ti), iron (Fe), manganese (Mn), vanadium (V), nickel (Ni), cobalt (Co), and a combination of at least two thereof.

In one embodiment, the self-standing electrode is a positive electrode. For example, the electrochemically active material comprises lithiated iron phosphate particles ($LiFePO_4$ or LFP) or comprises pyromellitic dianhydride (PMDA), 1,4,5,8-naphthalenetetracarboxylic dianhydride (NTCDA), or 3,4,9,10-perylenetetracarboxylic dianhydride (PTCDA).

In another embodiment, the self-standing electrode is a negative electrode. For example, the electrochemically active material comprises lithium titanate ($Li_4Ti_5O_{12}$, also known as LTO) particles or a carbon-based material. For example, the carbon-based material is graphene or graphite.

In another embodiment, the second electronically conductive material is selected from carbon black, acetylene black, graphite, graphene, carbon fibers, carbon nanofibers, carbon nanotubes, and a combination of at least two thereof. For example, the second electronically conductive material is selected from acetylene black (such as Denka™ Black), carbon fibers, carbon nanotubes, and combinations thereof. Preferably, the second electronically conductive material comprises carbon fibers, a combination of carbon fibers and acetylene black (such as Denka™ Black), or a combination of carbon fibers and carbon nanotubes. For example, the carbon fibers are vapor grown carbon fibers (VGCFs). The carbon fibers may be present in the combination at a concentration of at least 50% by weight.

In another embodiment, the second electronically conductive material is further grafted with at least one aryl group of Formula I.

In another embodiment, the hydrophilic functional group is a carboxylic acid or sulfonic acid group. In one example, the aryl group of Formula I is p-benzoic acid or p-benzenesulfonic acid.

According to another aspect, the present technology relates to a process for producing a self-standing electrode as defined herein, the process comprising the following steps:

(a) grafting at least one aryl group of Formula I on a first electronically conductive material;

(b) dispersing the first electronically conductive material in an aqueous mixture comprising cellulose fibers to obtain a first aqueous dispersion;

(c) filtering the first aqueous dispersion on a filter membrane to obtain a film;

(d) dispersing an electrochemically active material and optionally a second electronically conductive material in an aqueous medium to obtain a second aqueous dispersion;

(e) filtering the second aqueous dispersion on the film obtained in step (c) to produce a self-standing electrode on the filter membrane; and (f) peeling off the self-standing electrode from the filter membrane.

In another embodiment, the film obtained in step (c) comprises a side rich in first electronically conductive material and a side rich in cellulose fibers, the side rich in first electronically conductive material facing the filter membrane.

In another embodiment, the electrochemically active material is in the form of particles coated with a carbon layer and the process further comprises a step of grafting at least one aryl group of Formula I on said carbon layer prior to step (d).

In another embodiment, the process as defined herein further comprises a step of calendering the self-standing electrode. For example, the calendering step is carried out at a temperature between room temperature and about 80° C.

In another embodiment, the present process further comprises a step of producing a separator by filtering an aqueous mixture comprising cellulose fibers directly on the self-standing electrode obtained in step (e) prior to step (f).

In another embodiment, the process as defined herein further comprises a step of grafting at least one aryl group of Formula I on the second electronically conductive material prior to step (d). For example, the grafting steps of the process comprise:

(i) generating an aryl diazonium ion from an aniline of Formula II:

Formula II

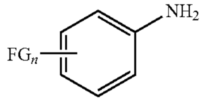

wherein FG and n are as defined herein, in the presence of a diazotizing agent; and (ii) reacting the aryl diazonium ion generated in step (i) with the first or second electronically conductive material, or with the carbon layer on the electrochemically active material.

In another embodiment, the diazotizing agent is present in a range of values of from 0.01 to 0.04 equivalent with respect to the carbon, or of about 0.03 equivalent with respect to the carbon. Alternatively, the diazotizing agent is present in a quantity in the range of from 1 to 4 molar equivalents with respect to the aniline of Formula II, or of about 3 molar equivalents with respect to the aniline of Formula II. For example, the diazotizing agent is a nitrite salt or an alkyl nitrite such as sodium nitrite ($NaNO_2$) or tert-butyl nitrite (t-BuONO).

In another embodiment, the aryl diazonium ion is generated in situ such that steps (i) and (ii) are performed simultaneously.

According to another aspect, the present technology relates to an electrochemical cell comprising a negative electrode, a positive electrode, and an electrolyte, wherein at least one of the negative and positive electrodes is a self-standing electrode as defined herein. Alternatively, the negative electrode and the positive electrode are both self-standing electrodes.

In another embodiment, the present electrochemical cell further comprises a separator. For example, the separator is a polypropylene separator (PP), a polypropylene-polyethylene-polypropylene separator (PP/PE/PP), or a cellulosic separator. Preferably, the separator is a cellulosic separator. For example, the cellulosic separator is produced by filtering an aqueous mixture comprising cellulose fibers directly on the surface rich in electrochemically active material of the self-standing electrode.

In another embodiment, the electrolyte is a liquid electrolyte comprising a lithium salt in a solvent. According to an alternative, the electrolyte is a gel electrolyte comprising a lithium salt in a solvent and optionally a solvating polymer. According to another alternative, the electrolyte is a solid polymer electrolyte comprising a lithium salt in a solvating polymer.

According to another aspect, the present technology relates to a battery comprising at least one electrochemical cell as defined herein. For example, the battery is a lithium or lithium-ion battery, a sodium or sodium-ion battery, or a magnesium or magnesium ion battery. In a preferred embodiment, the battery is a lithium-ion battery.

Figure 16A:
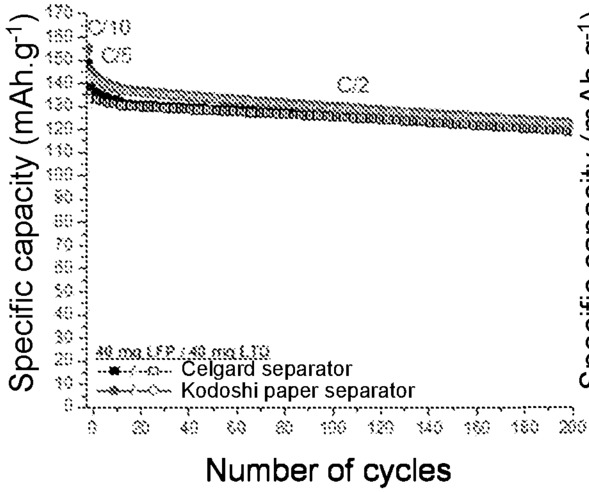
Figure 16B:
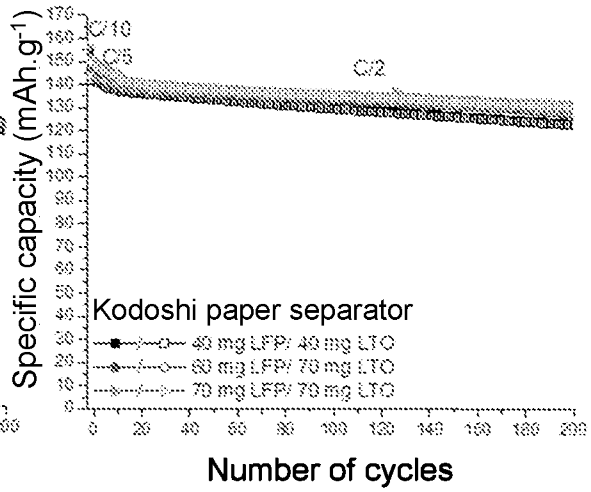

FIGS. 16(A)-16(B) shows the specific capacity results over 200 cycles at a constant charge/discharge current of C/2 between 1.0 and 2.5 V vs. LTO, where stability is compared for (A) identical LFP/LTO batteries except for the use of Celgard™ (square) and Kodoshi™ paper (circles) separators; and (B) batteries LFP/LTO using Kodoshi™ paper separators and different amounts of LFP and LTO with LFP/LTO weight ratios of 1 or about 0.85. Full and empty symbols are used to represent the charge and discharge results, respectively.

Figure 17:
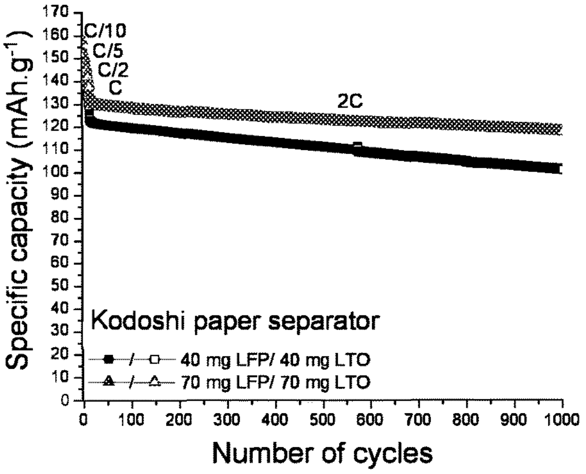

FIG. 17 shows the specific capacity results over 1000 cycles at a constant charge/discharge current of 2C between 1.0 and 2.5 V vs. LTO, for LFP/LTO batteries by varying the amount of LFP and LTO with a LFP/LTO weight ratio of 1 and Kodoshi™ paper separators. Full and empty symbols are used to represent the charge and discharge results, respectively.

Figure 18A:
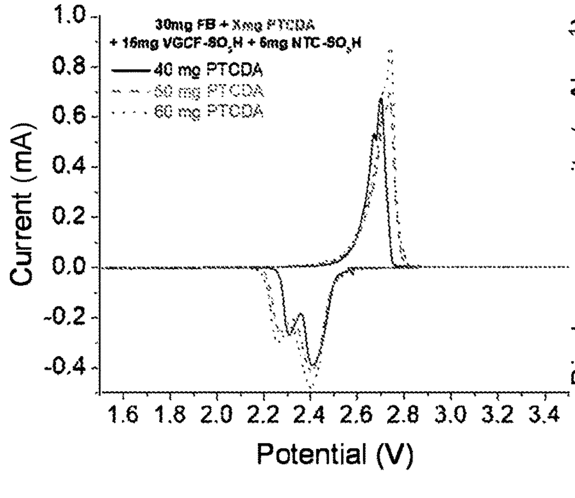
Figure 18B:
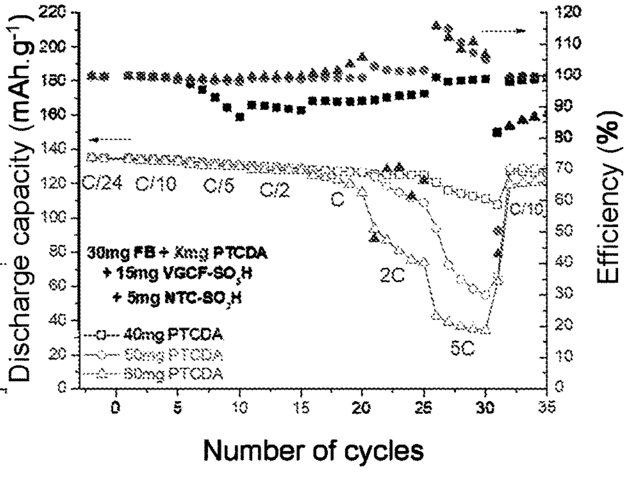

FIGS. 18(A)-18(B) shows results of (A) the cyclic voltammetry at a scan rate of 0.03 mV/s; and (B) the discharge capacity and coulombic efficiency versus the number of cycles at rates between C/24 and 5C, obtained with three self-standing organic electrodes containing a mixture of VGCFs-$SO_3H$, CNTs-$SO_3H$ and various amounts of 3,4,9,10-perylenetetracarboxylic dianhydride (PTCDA). Full and empty symbols are used to represent the coulombic efficiency (%) and the discharge capacity, respectively.

Figure 19A:
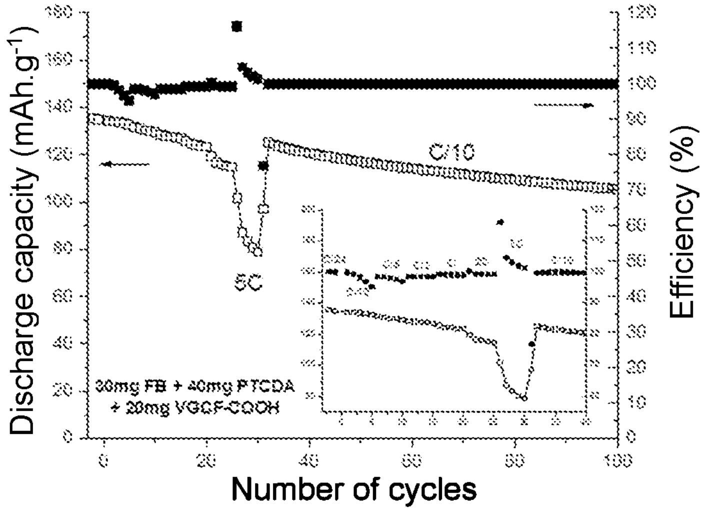
Figure 19B:
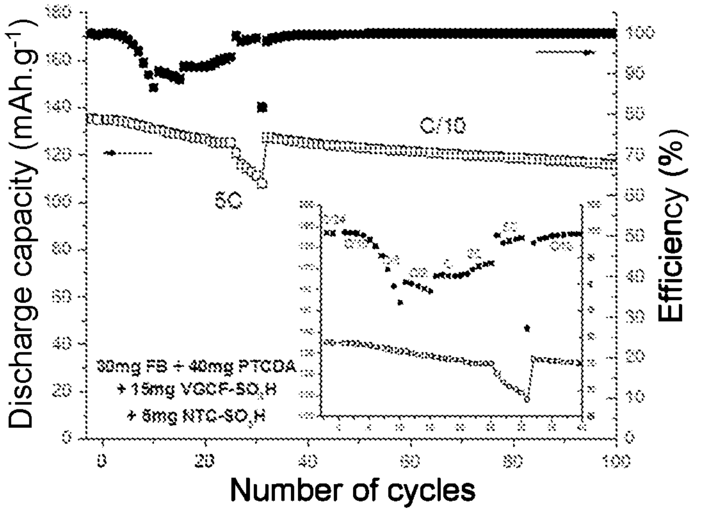

FIGS. 19(A)-19(B) shows the discharge capacity and the coulombic efficiency results as a function of the number of cycles at a constant charge/discharge current of C/10 between 1.5 and 3.5 V vs. $Li/Li^+$ obtained with two self-standing organic electrodes containing (A) VGCFs-$SO_3H$ and PTCDA; and (B) a mixture of VGCFs-$SO_3H$, CNTs-$SO_3H$ and PTCDA. Full and empty symbols are used to represent the coulombic efficiency (%) and the discharge capacity, respectively. The inserts in both (A) and (B) represent the discharge capacity results at different C-rates performed before the long cycling experiment.

Figure 20:
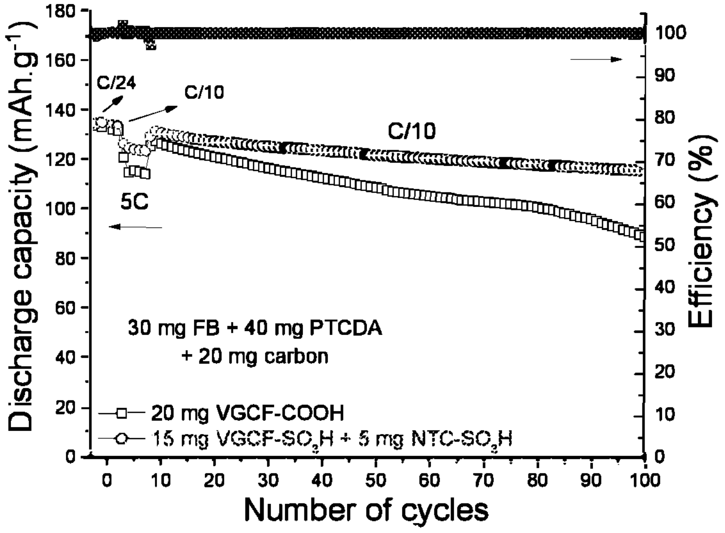

FIG. 20 shows the discharge capacity and the coulombic efficiency results as a function of the number of cycles at a constant charge/discharge current of C/10 between 1.5 and 3.5 V vs. $Li/Li^+$ obtained with two self-standing PTCDA electrodes containing VGCFs-$SO_3H$ (squares), and a mixture of VGCFs-$SO_3H$ and CNTs-$SO_3H$ (circles), respectively. Full and empty symbols are used to represent the coulombic efficiency (%) and the discharge capacity, respectively.

Figure 21:
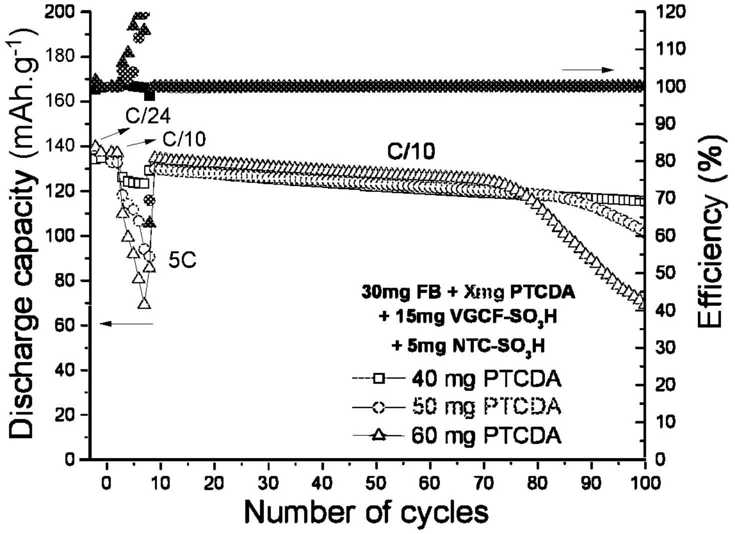

FIG. 21 shows the discharge capacity and the coulombic efficiency results as a function of the number of cycles at a constant charge/discharge current of C/10 between 1.5 and 3.5 V vs. $Li/Li^+$ obtained with three self-standing PTCDA electrodes containing a mixture of VGCFs-$SO_3H$ and CNTs-$SO_3H$, and different amounts of PTCDA. Full and empty symbols are used to represent the coulombic efficiency (%) and the discharge capacity, respectively.

Figure 22:
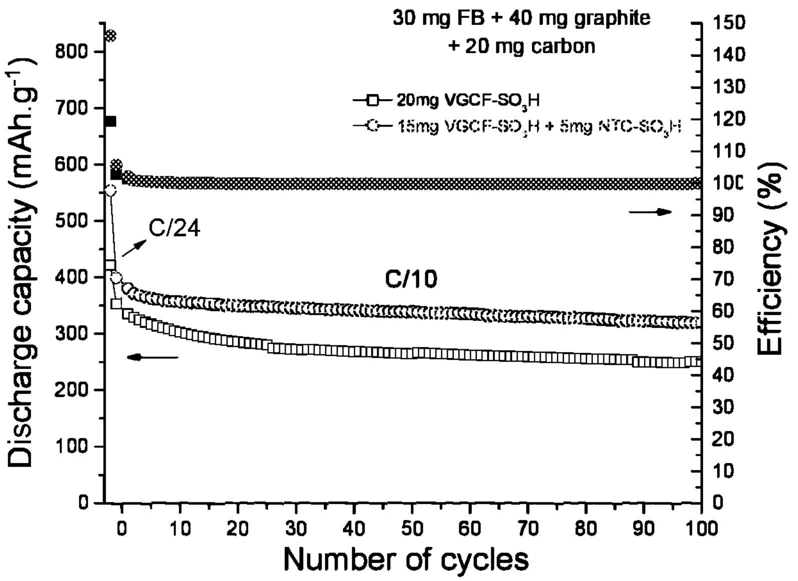

FIG. 22 shows the discharge capacity and the coulombic efficiency results as a function of the number of cycles at a constant charge/discharge current of C/10 between 0 and 1.5 V vs. $Li/Li^+$, obtained with two graphite electrodes, one containing VGCFs-$SO_3H$ (squares), the other containing a mixture of VGCFs-$SO_3H$ and CNTs-$SO_3H$ (circles). Full and empty symbols are used to represent the coulombic efficiency (%) and the discharge capacity, respectively.

Figure 23A:
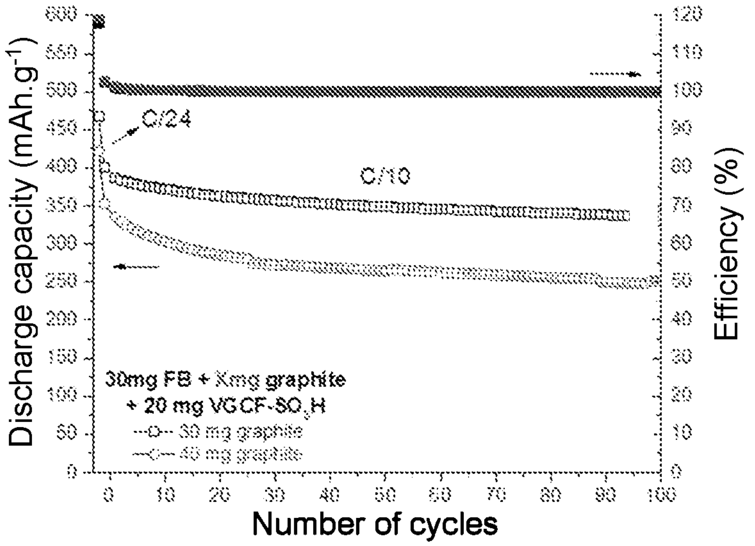
Figure 23B:
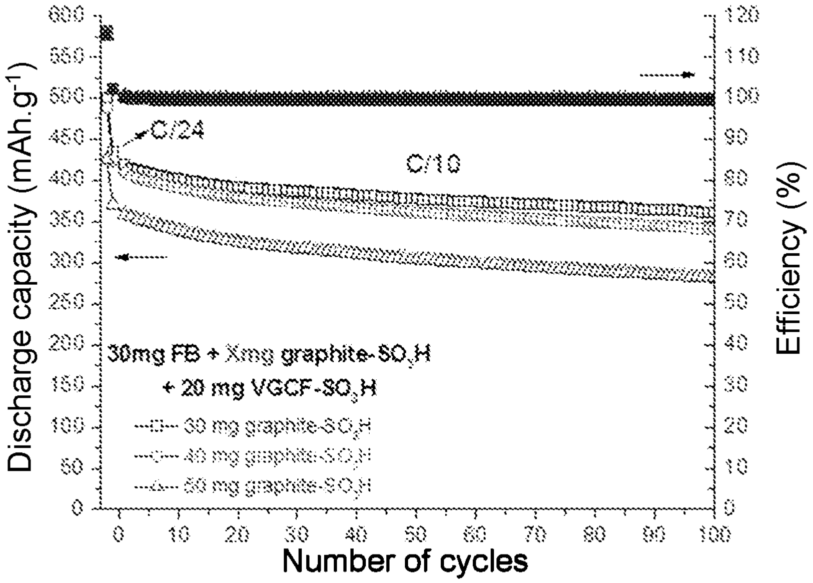

FIGS. 23(A)-23(B) shows the discharge capacity and the coulombic efficiency results as a function of the number of cycles at a constant charge/discharge current of C/10 between 0 and 1.5 V vs. $Li/Li^+$ obtained with (A) two electrodes containing VGCFs-$SO_3H$ containing and 30 mg or 40 mg of graphite, and (B) three electrodes containing VGCFs-$SO_3H$ and 30 mg, 40 mg, or 50 mg of graphite-$SO_3H$. Full and empty symbols are used to represent the coulombic efficiency (%) and the discharge capacity, respectively.

Figure 24A:
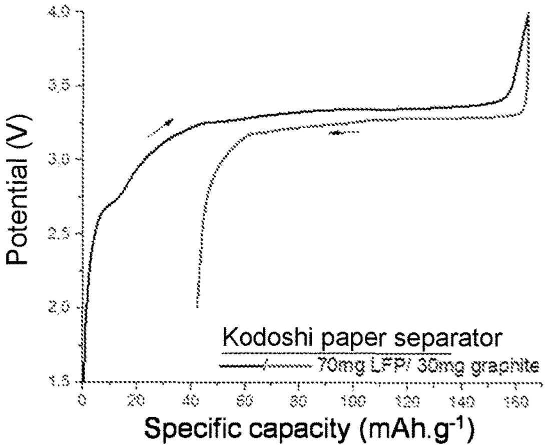
Figure 24B:
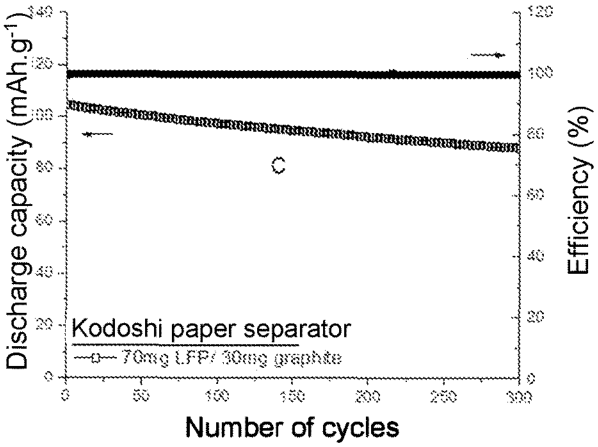

FIGS. 24(A)-24(B) shows (A) the first charge and discharge obtained at a constant current of C/24 between 2 and 4 V vs. graphite for an LFP/graphite battery using Kodoshi™ paper separators and an excess of anode capacity; and (B) the corresponding long cycling experiment performed at a rate of 10. Full and empty symbols are used in (B) to represent the charge and the discharge results, respectively.

Figure 25A:
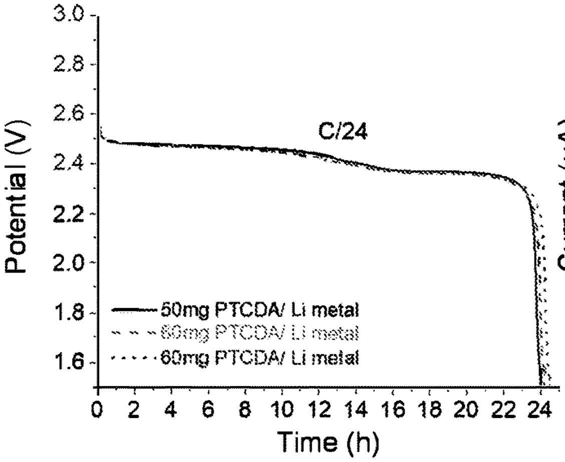
Figure 25B:
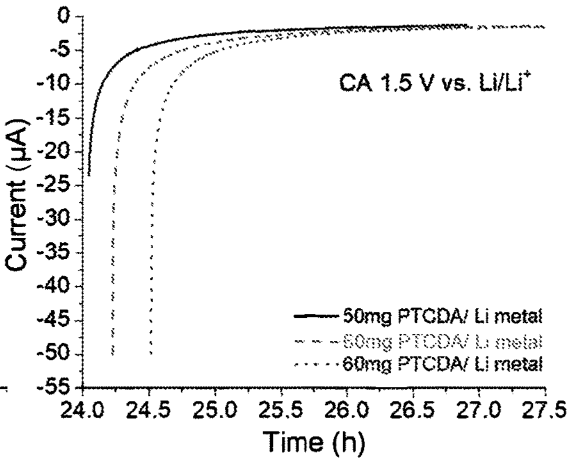

FIGS. 25(A)-25(B) shows results of (A) the first discharge obtained at a constant current of C/24 from the open circuit potential (OCP) to 1.5 V vs $Li/Li^+$ for three different PTCDA/lithium metal batteries comprising various amounts of PTCDA; and (B) the chronoamperometry performed directly after the first discharge for these three batteries with a potential fixed at 1.5 V vs. $Li/Li^+$ for 3 h.

Figure 26A:
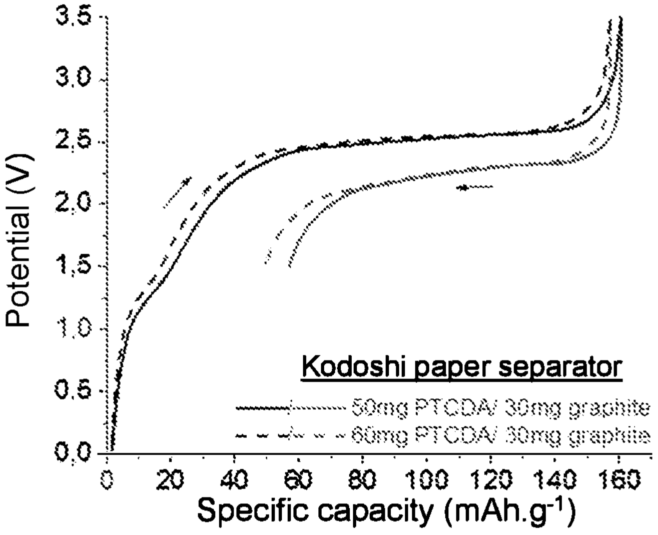
Figure 26B:
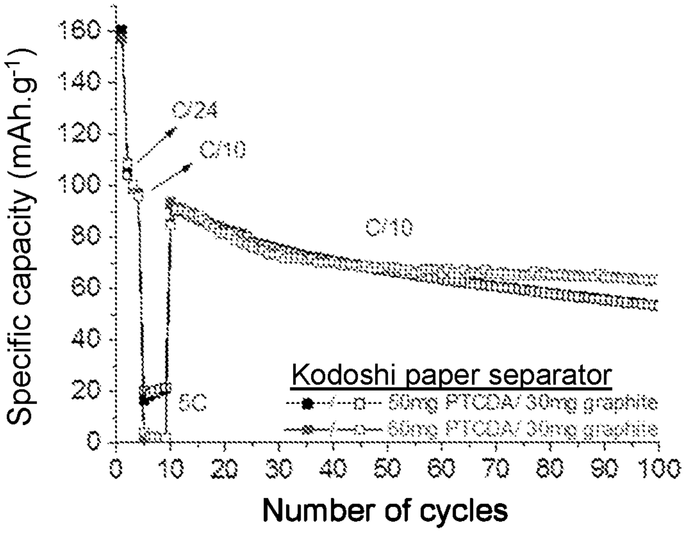

FIGS. 26(A)-26(B) shows results of (A) the first charge and discharge obtained at a constant current of C/24 between 1.5 and 3.5 V vs. graphite for two prelithiated PTCDA/graphite batteries using Kodoshi™ paper separators and an excess of anode capacity; and (B) the corresponding long cycling experiment performed on the same batteries at a rate of C/10 after a formation at 5C. Full and empty symbols are used in (B) to represent the charge and discharge, respectively.

DETAILED DESCRIPTION

All technical and scientific terms and expressions used herein have the same definitions as those commonly understood by the person skilled in the art of the present technology. The definition of some terms and expressions used is nevertheless provided below.

The terms "approximately" and its equivalent "about" as used herein mean in the region of, and around. For example, when the term "approximately" or "about" is used in connection with a numerical value, it can modify it above and below by a variation of 10% or 5% with respect to the nominal value. This term can also take into account, for example, the experimental error of a measuring apparatus or rounding.

If the term "predominantly" or "mainly" is used in connection with a concentration in this document, it means, unless otherwise indicated, a concentration greater than 50% by volume or by weight depending on whether the term is associated with a nominal value in volume or weight, respectively.

The chemical structures described herein are drawn according to conventional standards. Also, when an atom, such as a carbon atom, as drawn seems to include an incomplete valency, the valency is then assumed to be satisfied by one or more hydrogen atoms even if they are not necessarily explicitly drawn.

The expression "self-standing electrode" as used herein refers to an electrode without a metal current collector.

The expression "organic semiconductor" as used herein refers to pi-bonded molecules or polymers comprising carbon atoms and hydrogen atoms. The molecule or polymer may further comprise heteroatoms (such as N, S and O).

The term "aryl" as used herein refers to substituted or unsubstituted aromatic rings, the contributing atoms may form one ring or a plurality of fused rings. Representative aryl groups include groups having from 6 to 14 ring members. For example, the aryl may include phenyl, naphthyl, etc. The aromatic ring may be substituted at one or more ring positions with, for example, a carboxyl (—COOH) or sulfonic acid (—$SO_3H$) group, an amine group, and other similar groups.

The expression "hydrophilic functional group" as used herein refers to functional groups attracted to water molecules. Hydrophilic functional groups may generally be charged and/or capable of forming hydrogen bonds. Non-limiting examples of hydrophilic functional groups comprise hydroxyl, carboxylic acid, sulfonic acid, phosphonic acid, amine, amide and other similar groups. The expression further includes salts of these groups when applicable.

The present application describes self-standing electrodes, for example, flexible self-standing electrodes. The present application also describes a water-based filtration process inspired by the paper industry for making the self-standing electrodes. The present application also describes the use of these self-standing electrodes in electrochemical cells. For instance, the present application describes the use of self-standing electrodes in lithium-ion batteries (LIBs).

The present self-standing electrodes and their process of manufacture exclude one or more of the following elements: a current collector (for example, aluminum or copper current collector), a costly binder, or a harmful solvent (for example, N-methyl-2-pyrrolidone (NMP)). The self-standing electrodes obtained by the present process may also be recyclable.

The process of the present application uses unmodified cellulose as binder for the self-standing electrodes. Unmodified cellulose is an abundant, natural and low-cost polymer. In addition, the process of the present application is relatively simple, rapid, and easily scalable to industrial production. For example, the present process may use only water as a solvent.

The present process may also involve the preparation of water-soluble (dispersible) carbons which may accelerate the preparation and/or facilitate the dispersion of the electrode materials in water. For example, an improvement in the distribution of these modified carbons in the electrode may allow the improvement of electrochemical performance.

As examples, a variety of flexible self-standing electrodes, including LFP, graphite, 3,4,9,10-perylenetetracarboxylic dianhydride (PTCDA), and LTO electrodes, having good mechanical resistance were obtained by the present process. The self-standing electrodes of the present application remain substantially intact (in their original state), even after punching the self-standing electrodes, after cycling and/or even after opening of the electrochemical cells. The electrochemical performance of the present positive and/or negative self-standing electrodes tested are at least similar to those commonly reported for LFP and/or LTO electrodes spread on metal current collectors (for example, an aluminum or copper current collector) following a conventional manufacturing process. The electrochemical cells generally maintain a good stability and a substantially high specific capacity, even in long-term cycling.

The present technology thus relates to a self-standing electrode comprising:

a first electronically conductive material serving as a current collector, the surface of said first electronically conductive material being grafted with at least one aryl group of Formula I:

Formula I

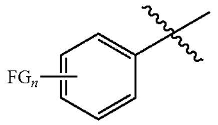

wherein:

FG is a hydrophilic functional group; and n is an integer in the range of 1 to 5, preferably n is in the range of 1 to 3, preferably n is 1 or 2, or more preferably n is 1;

a binder comprising cellulose fibers;

an electrochemically active material; and optionally a second electronically conductive material;

wherein:

the self-standing electrode consists of a solid film having a first surface and a second surface;

the concentration of the first electronically conductive material increases from the second surface to the first surface of the solid film; and the concentration of the electrochemically active material, and optionally the second electronically conductive material, increases from the first surface to the second surface of the solid film.

According to one example, the first surface mainly comprises the first electronically conductive material. The first electronically conductive material may comprise carbon fibers such as vapor grown carbon fibers (VGCFs).

Examples of hydrophilic functional groups include hydroxyl, carboxylic acid, sulfonic acid, phosphonic acid, amine, amide, and other similar groups. For example, the hydrophilic functional group is a carboxylic acid or sulfonic acid functional group. Preferred examples of the aryl group of Formula I are p-benzoic acid or p-benzenesulfonic acid.

The binder comprises cellulose fibers, in particular unmodified cellulose fibers. For example, unmodified cellulose fibers do not contain aluminum cations. As previously described, conventional cellulose fibers are often modified with aluminum sulfate hydrate as an adjuvant, thereby neutralizing the negative charge present on the cellulose fibers by aluminum cations. The cellulose fibers of the present application are not treated with aluminum sulfate hydrate as this compound may possibly react inside the batteries, for example, during cycling.

According to one example, the average length of the cellulose fibers is between 5 nm and 5 mm, or between 250 nm and 3 mm, or between 500 nm and 3 mm, or between 1 µm and 3 mm, or between 100 µm and 3 mm, or between 250 µm and 3 mm, or between 500 µm and 3 mm, or between 750 µm and 2.5 mm, or between 1 mm and 2.5 mm.

The second surface of the present self-standing electrode mainly comprises the electrochemically active material and, optionally, the second electronically conductive material.

According to one example, the electrochemically active material may be in the form of particles. According to another example, the electrochemically active material can be in the form of particles coated with a carbon layer in a core-shell configuration. The carbon layer may optionally be further grafted with at least one aryl group of Formula I.

Non-limiting examples of electrochemically active materials include materials such as metal phosphate, lithiated metal phosphate, metal oxide, and lithiated metal oxide, for example, the metal is a transition metal selected from Ti, Fe, Mn, V, Ni, Co and their combinations. For example, the electrochemically active material comprises a lithiated or non-lithiated metal phosphate (for example, $LiM'PO_4$ and $M'PO_4$ where M' is Fe, Ni, Mn, Co, or a combination thereof), a vanadium oxide (for example, $LiV_3O_8$, $V_2O_5$, $LiV_2O_5$, and the like), other lithiated metal oxides such as $LiMn_2O_4$, $LiM''O_2$ (M'' being Mn, Co, Ni, or a combination thereof), $Li(NiM''')O_2$ (M''' being Mn, Co, Al, Fe, Cr, Ti, Zr, and the like, or a combination thereof), a titanate or lithium titanate (for example, $TiO_2$, $Li_2TiO_3$, $Li_4Ti_5O_{11}$, $H_2Ti_5O_{11}$, $H_2Ti_4O_9$, or a combination thereof), or a combination of two or more of the above materials when compatible. When the self-standing electrode is a positive electrode, the electrochemically active material may, for example, comprise lithium metal phosphate particles (such as $LiFePO_4$, also known as LFP). When the self-standing electrode is a negative electrode, the electrochemically active material may, for example, comprise lithium titanate particles (such as $Li_4Ti_5O_{12}$, also known as LTO).

According to one alternative, the electrochemically active material may be a carbon-based material such as graphene or graphite. According to another alternative, the electrochemically active material may also be an active organic material such as an electrode material comprising a polymer or polyaromatic-type active material. For example, the active organic material may be an organic semiconductor.

Non-limiting examples of active organic material include dianhydride-based polymers such as pyromellitic dianhydride (PMDA), 1,4,5,8-naphthalenetetracarboxylic dianhydride (NTCDA) and 3,4,9,10-perylenetetracarboxylic dianhydride (PTCDA). According to one variant of interest, the dianhydride-based organic material is PTCDA. PTCDA may, for example, be selected for its low cost or for its theoretical capacity of 273 $mAh \cdot g^{-1}$.

According to an example, the dianhydride-based polymer may be of Formula III(a), III(b) or III(c):

Formula III(a)

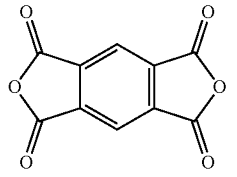

Formula III(b)

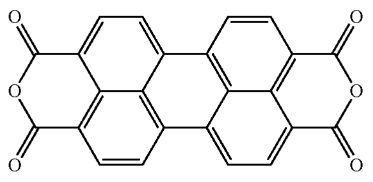

Formula III(c)

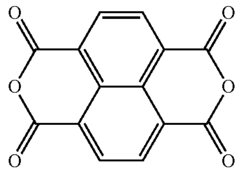

For example, electrochemical performance (capacity and coulombic efficiency) obtained with the self-standing positive electrodes comprising PTCDA are significantly improved compared to those commonly reported for PTCDA positive electrodes and for lower electrochemically active material loadings (see Sharma, P. et al., *The Journal of Physical Chemistry Letters* 4.19 (2013): 3192-3197).

According to another example, the active organic material may comprise a quinone derivative such as an anthraquinone.

According to another example, the second electronically conductive material is optionally grafted with at least one aryl group of Formula I.

Non-limiting examples of the second electronically conductive material include carbon black (such as Ketjen™ carbon), acetylene black (such as Shawinigan carbon and Denka™ carbon), graphite, graphene, carbon fibers (such as carbon nanofibers or VGCFs), and carbon nanotubes (CNTs), or a combination of at least two thereof. The second electronically conductive material may comprise at least one material selected from acetylene black (such as Denka™ carbon), carbon fibers (VGCFs), carbon nanotubes, and combinations thereof. For example, the second electronically conductive material comprises VGCFs, a combination of VGCFs and Denka™ carbon or a combination of VGCFs and CNTs. According to a variant of interest, when VGCFs are present in combination with another electronically conductive material (for example, CNTs or Denka™), the VGCFs are present in the combination at a concentration of 50% by weight or more.

According to a second aspect, the present technology relates to a process for producing self-standing electrodes, the process comprising the following steps:

(a) grafting at least one aryl group of Formula I on a first electronically conductive material;
(b) dispersing the first modified electronically conductive material obtained in step (a) in an aqueous mixture comprising cellulose fibers to obtain a first aqueous dispersion;
(c) filtering the first aqueous dispersion on a filter membrane to obtain a film;
(d) dispersing an electrochemically active material and optionally a second electronically conductive material in an aqueous medium to obtain a second aqueous dispersion;
(e) filtering the second aqueous dispersion on the film obtained in step (c) to produce a self-standing electrode on the filter membrane; and
(f) peeling off the self-standing electrode from the filter membrane.

According to one example, the grafting of an aryl group on an electronically conductive material can be carried out as illustrated in Scheme 1:

Scheme 1

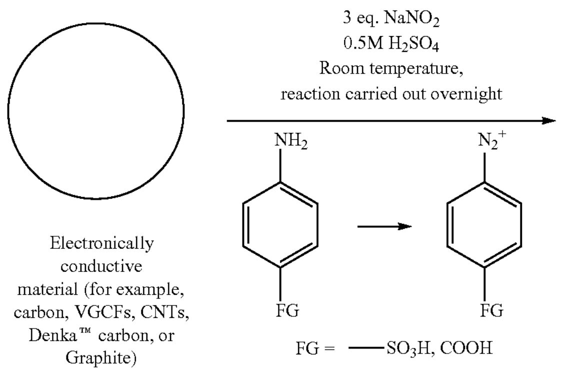

-continued

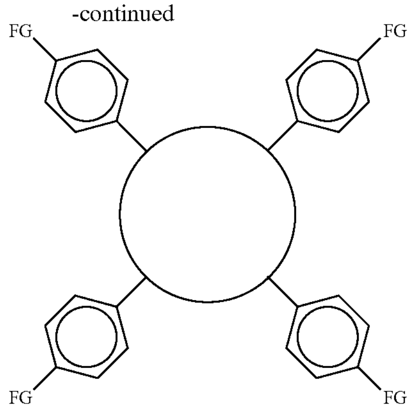

According to one example, the grafting of an aryl group on a carbon layer present on the surface of the electrochemically active material can be carried out as illustrated in Scheme 2:

Scheme 2

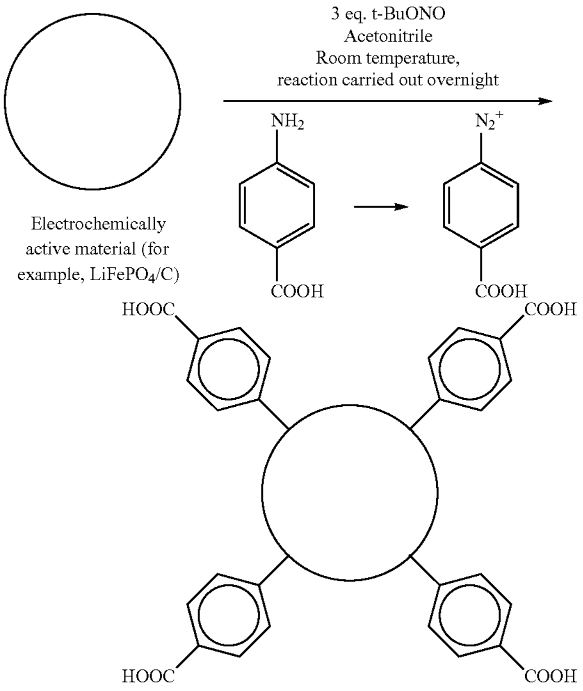

Scheme 2 uses by way of illustration a COOH group as the hydrophilic functional group (FG), but it is understood that the process also applies to the other hydrophilic functional groups.

According to one example, the process further comprises a step of grafting at least one aryl group of Formula I on the second electronically conductive material prior to step (d). The grafting of an aryl group of Formula I on the electronically conductive material can be carried out as illustrated in Scheme 1.

In general, the grafting steps of the process comprise:

(i) generating an aryl diazonium ion from an aniline of Formula II:

Formula II

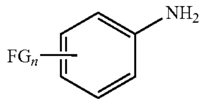

wherein FG and n are as defined herein, in the presence of a diazotization agent; and (ii) reacting the aryl diazonium ions generated in step (i) with a carbon layer on the surface of the electrochemically active material or with the first or the second electronically conductive material.

According to one variant, the aryl diazonium ion is generated in situ, i.e. step (i) is carried out in the presence of the carbon layer of the electrochemically active material or alternatively of the first or second electronically conductive material of step (ii). In this variant, the diazonium ion reacts, as it is formed, with the carbon of the carbon layer or, alternatively, of the first or second electronically conductive material. According to another variant, the aryl diazonium ion may also be generated prior to the addition of the electrochemically active material or the first or second electronically conductive material. According to a third variant, the diazonium ion may be generated prior to its addition to the electrochemically active material or to the first or second electronically conductive material.

The amount of diazotizing agent used may be in the range of 1 to 4 molar equivalents, preferably about 3 molar equivalents, with respect to the aniline. In one example, the amount of diazotizing agent used may be in the range of 0.01 to 0.04 equivalent with respect to the carbon. For example, the diazotizing agent is a nitrite salt or an alkyl nitrite. When the grafting step is performed on the first or second electronically conductive material, the diazotizing agent may be a nitrite salt, for example, sodium nitrite ($NaNO_2$). Alternatively, when the grafting step is performed on the carbon layer of the electrochemically active material, the diazotizing agent may be an alkyl nitrite, for example, tert-butyl nitrite (t-BuONO).

According to one example, when the grafting step is performed on the first or second electronically conductive material, it may be carried out in an acidic aqueous medium. For example, the aqueous acidic medium may be a sulfuric acid ($H_2SO_4$) aqueous solution.

According to one example, when the grafting step is performed on the carbon layer on the surface of the electrochemically active material, it may be carried out in a polar aprotic solvent such as acetonitrile.

The film obtained in step (c) comprises a side rich in first electronically conductive material and a side rich in cellulose fibers, the side rich in first electronically conductive material facing the filter membrane.

According to a variant, the process further comprises a step of drying the film obtained in step (c).

According to another example, the electrochemically active material is in the form of particles coated with a carbon layer and the process further comprises a step of grafting at least one aryl group of Formula I on said carbon layer prior to step (d).

According to another example, the process further comprises a step of calendering the self-standing electrode. For example, the calendering step can be carried out at a temperature between room temperature and about 80° C., for example, in the range of from about 25° C. to about 80° C. For example, the calendering step can be carried out at room temperature. Alternatively, the calendering step can be carried out at a temperature in the range of from about 50° C. to about 80° C.

According to another example, the process further comprises a step of producing a separator by filtration of an aqueous mixture comprising cellulose fibers directly on the self-standing electrode produced in step (e), the step of producing a separator thus being generally performed prior to step (f).

According to a third aspect, the present technology relates to an electrochemical cell comprising a negative electrode, a positive electrode and an electrolyte, wherein at least one of the negative and positive electrodes is a self-standing electrode as defined herein. Alternatively, the negative electrode and the positive electrode are both self-standing electrodes as defined herein.

According to another example, the electrochemical cell further comprises a separator. Non-limiting examples of separators may comprise membranes of polyethylene (PE), polypropylene (PP), cellulose, polytetrafluoroethylene (PTFE), polyvinylidene fluoride (PVDF), or polypropylene-polyethylene-polypropylene (PP/PE/PP). According to one variant of interest, the separator is a PP or PP/PE/PP separator (for example, a separator developed by Celgard™) or a cellulosic separator (for example, a separator prepared according to the present process or a paper separator commercialized by Nippon Kodoshi Corporation).

According to a variant, the separator is a cellulosic separator produced by filtering an aqueous mixture comprising cellulose fibers directly on the self-standing electrode side rich in electrochemically active material.

The electrolyte is usually selected for its compatibility with the various elements of the electrochemical cell. Any type of electrolyte is contemplated, for example, liquid, gel or solid electrolytes. For example, the electrolyte may be a liquid electrolyte comprising a lithium salt in a solvent. Alternatively, the electrolyte may be a gel electrolyte comprising a lithium salt in a solvent and/or a solvating polymer. According to another alternative, the electrolyte may be a solid polymer electrolyte comprising a lithium salt in a solvating polymer.

Non-limiting examples of lithium salts may include lithium hexafluorophosphate ($LiPF_6$), lithium bis(trifluoromethanesulfonyl)imide (LiTFSI), lithium bis(fluorosulfonyl)imide (LiFSI), lithium 2-trifluoromethyl-4,5-dicyanoimidazolate (LiTDI), lithium 4,5-dicyano-1,2,3-triazolate (LiDCTA), lithium bis(pentafluoroethylsulfonyl)imide (LiBETI), lithium tetrafluoroborate ($LiBF_4$), lithium bis(oxalato)borate (LiBOB), lithium nitrate ($LiNO_3$), lithium chloride (LiCl), lithium bromide (LiBr), lithium fluoride (LiF), lithium perchlorate ($LiClO_4$), lithium hexafluoroarsenate ($LiAsF_6$), lithium trifluoromethanesulfonate ($LiSO_3CF_3$) (LiTf), lithium fluoroalkylphosphate $Li[PF_3(CF_2CF_3)_3]$ (LiFAP), lithium tetrakis(trifluoroacetoxy)borate $Li[B(OCOCF_3)_4]$ (LiTFAB), lithium bis(1,2-benzenediolato(2-)-O,O')borate $Li[B(C_6O_2)_2]$ (LBBB) and combinations thereof. According to one variant, the lithium salt is lithium hexafluorophosphate ($LiPF_6$).

For example, the solvent is a non-aqueous solvent. Non-limiting examples of non-aqueous solvents may include cyclic carbonates such as ethylene carbonate (EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), and dipropyl carbonate (DPC); lactones such as γ-butyrolactone (γ-BL) and γ-valerolactone (γ-VL); acyclic ethers such as 1,2-dimethoxyethane (DME), 1,2-diethoxyethane (DEE), trimethoxymethane, and ethoxymethoxyethane (EME); cyclic ethers such as 2-methyltetrahydrofuran, 1,3-dioxolane, and derivatives thereof; amides such as formamide, acetamide, and dimethylformamide; and other organic solvents such as dimethylsulfoxide, acetonitrile, propylnitrile, nitromethane, phosphoric acid triester, sulfolane derivatives, methylsulfolane, and mixtures thereof. According to one variant of interest, the non-aqueous solvent is a mixture of ethylene carbonate (EC)/diethyl carbonate (DEC) (for example, 3:7 by volume).

According to a fourth aspect, the present technology relates to a battery comprising at least one electrochemical cell as defined herein. For example, the battery is a lithium-ion battery.

According to a fifth aspect, the present technology relates to all-organic batteries comprising, for example, a self-standing organic positive electrode and a self-standing organic negative electrode. For example, the all-organic battery comprises a self-standing positive electrode comprising PTCDA and a self-standing negative electrode comprising graphite.

All-organic batteries (without transition metal) comprising a self-standing positive electrode with PTCDA and a self-standing negative electrode with graphite were prepared and electrochemically tested. These all-organic batteries (PTCDA/graphite) comprise organic redox molecules and biodegradable components. The present technology thus demonstrates the concept of inexpensive and biodegradable batteries.

According to a sixth aspect, the present technology relates to the recycling of self-standing electrodes as defined herein using an essentially ecological process. A battery based on recycled materials is also contemplated herein.

EXAMPLES

The following non-limiting examples are for illustrative purposes and should not be construed as further limiting the scope of the present invention. These examples will be better understood with reference to the accompanying Figures.

Example 1: Preparation of Self-Standing Electrodes (a) Preparation of an Aqueous Mixture Comprising Cellulose Fibers An aqueous mixture comprising cellulose fibers was prepared by dispersing 400 mg of Södra™ black R pulp fibers in 200 ml of deionized water and mixing vigorously with an ULTRA-TURRAX™ disperser for about 15 minutes. For reference, Södra™ black R pulp fibers comprise unmodified cellulose fibers having a length in the range of 2.05 to 2.25 mm.

The mixture was then cooled to room temperature and 200 ml of deionized water were then added to obtain an aqueous mixture comprising cellulose fibers at a concentration of about 1 g of cellulose fibers per liter of the mixture.

(b) Preparation of Water-Soluble Carbons (Modified Carbons)

The following process for the production of water-soluble carbons was applied to vapor grown carbon fibers (VGCFs), carbon nanotubes (CNTs), Denka™-type acetylene black, and graphite. The term carbon is used in the procedure below to refer to one or the other of these materials.

5 g of carbon were dispersed in 200 ml of a 0.5 M sulfuric acid ($H_2SO_4$) aqueous solution, then 0.01 equivalent of aniline p-substituted with one hydrophilic substituent ($—SO_3H$ or —COOH) was added to the mixture (i.e. 0.01 equivalent of aniline with respect to the carbon). The mixture was then stirred vigorously until complete dissolution of the amine.

After the addition of 0.03 equivalent of sodium nitrite ($NaNO_2$) with respect to the carbon (for example, 3 equivalents of $NaNO_2$ with respect to the aniline), the corresponding aryl diazonium ion was generated in situ and reacted with the carbon. The resulting mixture was allowed to react overnight at room temperature.

After completion of the reaction, the mixture was vacuum filtered using a vacuum filtration assembly (Büchner type) and a nylon filter having a pore size of 0.22 μm. The modified carbon powder thus obtained was then washed successively with deionized water until a neutral pH was reached, and then with acetone. Finally, the modified carbon powder was then dried under vacuum at 100° C. for at least one day before its use.

(c) Preparation of Hydrophilic Grafted C—$LiFePO_4$ Particles (Modified C-LFP)

Typically, 5 g of carbon-coated $LiFePO_4$ (2-3% by weight of carbon) were dispersed in 200 ml of acetonitrile, and then 0.01 equivalent of the p-substituted aniline with one hydrophilic —COOH substituent was added to the mixture (i.e. 0.01 equivalent of aniline with respect to the carbon). The mixture was subsequently stirred vigorously until complete dissolution of the amine. After the addition of 0.03 equivalent of tert-butyl nitrite (t-BuONO) with respect to the carbon, the corresponding aryl diazonium ion was generated in situ and reacted with the carbon coating. The resulting mixture was allowed to react overnight at room temperature.

After the reaction was completed, the mixture was vacuum filtered using a Büchner-type assembly and a nylon filter with a pore size of 0.22 μm. The modified particle powder thus obtained was then washed successively with N, N-dimethylformamide (DMF) and acetone. Finally, the modified C-LFP particle powder was dried under vacuum at 100° C. for at least one day before its use.

(d) Preparation of Self-Standing Electrodes

Figure 1:
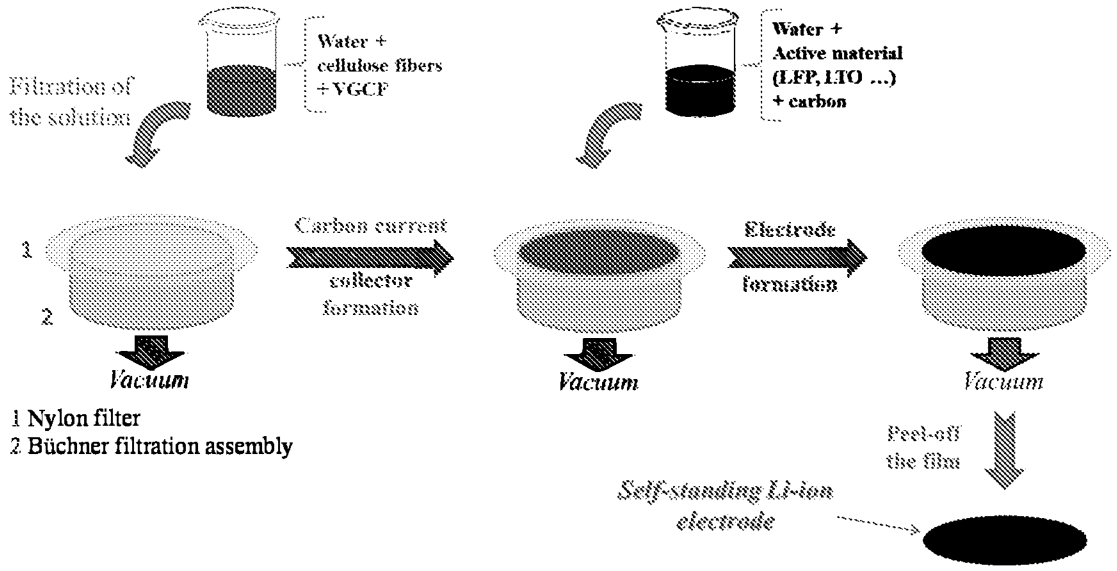
FIG. 1 schematically illustrates the process for the preparation of flexible self-standing electrodes according to one embodiment.

The self-standing electrodes were prepared as illustrated in FIG. 1. A volume of the aqueous mixture comprising cellulose fibers as described in Example 1(a) corresponding to about 30 mg of cellulose fibers was added in a beaker. 10 mg of unmodified VGCF carbon fibers, or VGCFs-$SO_3H$ or VGCFs-COOH, as described in Example 1(b), were then added to the beaker, and dispersed in the aqueous mixture comprising cellulose fibers to obtain a first aqueous dispersion. The first aqueous dispersion was then stirred using an ultrasonic rod. The grafted hydrophilic VGCFs powders VGCF—$SO_3H$ and VGCF—COOH were instantly solubilized in the aqueous mixture while the commercial unmodified VGCF carbon fibers took at least 10 minutes to solubilize. Once homogeneous, the first aqueous dispersion was filtered using a Büchner-type assembly and a nylon filter membrane having a pore size of 0.22 μm and a flexible film was obtained ((see FIG. 2(C)). For example, the electronically conductive material rich side of the obtained film (see FIG. 2(A)) can serve as a current collector. The other side of the resulting film is a cellulose fibre-rich side (see FIG. 2(B)). The electronically conductive material rich side faces the filter membrane upon filtration of the mixture. The resulting film was then dried for 10 minutes.

A quantity between 40 and 70 mg of electrochemically active material (LFP, PTCDA or LTO) was dispersed in about 50 ml of deionized water. In the case of PTCDA, as it is soluble in water, the preparation of PTCDA-based self-standing electrodes was simple and the PTCDA was strongly trapped inside the cellulose and VGCFs substrate.

10 mg of a modified or unmodified second electronically conductive material (modified or unmodified VGCFs, Denka™, and CNTs, or combinations thereof) were then added to the aqueous dispersion. Again, the grafted hydrophilic carbons and $LiFePO_4$ particles coated with grafted hydrophilic carbons were more easily and rapidly dispersed in water. The aqueous dispersion was then stirred, poured directly on the previously prepared film in the Büchner assembly and filtered to obtain a self-standing electrode on the filter membrane.

Figures 3A, 3B, 3C, 3D:
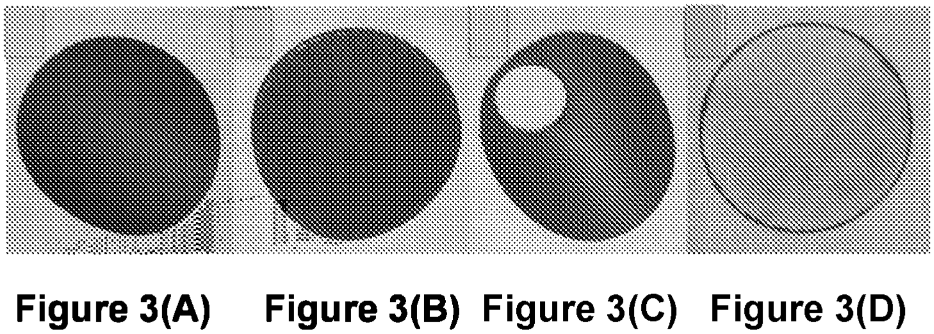
FIGS. 3(A)-3(D) shows photographs of a self-standing electrode as described in Example 1(d) showing in (A) a side rich in electronically conductive material; in (B) the electrochemically active material filling the pores of the side rich in cellulose fibers; in (C) that the film remains intact and resistant even after cutting a small electrode; and in (D) a self-standing electrode-separator film as described in Example 1(e).

The self-standing electrode was then peeled off from the filter membrane. The self-standing electrode was then calendered at room temperature, at 50° C. or at 80° C. The self-standing electrode thus obtained was then placed in a vacuum oven at a temperature of 130° C. for at least one day before its use in a battery. FIG. 3 shows an LFP electrode as prepared in this example. FIG. 3(A) shows the electronically conductive material rich side which remains shiny while FIG. 3(B) shows the electrochemically active material (LFP) filling the pores of the cellulose fibers rich side (opposite to the VGCFs-rich side). FIG. 3(C) shows that the film remained intact and resistant even after punching a small electrode.

(e) Preparation of Paper Separators

Optionally, a paper separator may be prepared directly on the self-standing electrode. A volume of an aqueous mixture comprising cellulose fibers prepared according to Example 1(a) and corresponding to about 30 mg of cellulose fibers is filtered directly on the electrochemically active material-rich side of the self-standing electrode prior to the step of peeling the self-standing electrode from the filter membrane. FIG. 3(D) shows a film comprising a self-standing electrode and a separator as herein defined comprising a VGCFs-rich side serving as a current collector, an integrated LFP electrode and a paper separator.

Example 2: Physical Characterization of the Films and Self-Standing Electrodes The films as described in Example 1(d) had a thickness of about 100 μm. Calendering of self-standing films reduced their thickness. In fact, an average 20 and 30% decrease in thickness was observed when the self-standing electrodes were calendered at a temperature of 50 and 80° C., respectively. The films were flexible, foldable, rollable and resistant as shown in FIG. 2.

Figures 2A, 2B, 2C:
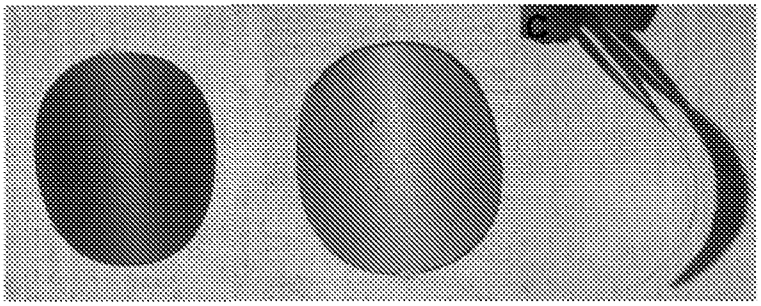
FIGS. 2(A)-2(C) shows photographs of a film as described in Example 1(d) showing in (A) a side rich in electronically conductive material; in (B) a side rich in cellulose fibers; and in (C) the flexibility and low thickness of the film.

FIG. 3(C) shows that punching an electrode in the self-standing electrode film did not substantially affect its integrity. As demonstrated in FIG. 3(A), the electronically conductive material rich side (FIG. 2(A)) obtained during the first manufacturing step remained substantially unchanged after the filtration of the mixture containing the electrochemically active material step. As illustrated in FIG. 2(B), the pores of the cellulose fiber-rich side were filled with the electrochemically active material and the second electronically conductive material during the second filtration step.

The self-standing electrode thus obtained consists in a cellulose-based solid film having two surfaces. One of the two surfaces mainly comprises the first electronically conductive material and the other surface mainly comprises the electrochemically active material and the second electronically conductive material.

The process described in Example 1(d) is quite interesting since the metal current collectors are replaced by carbon serving as a current collector. The weight of the metal current collectors may, for example, be replaced with more cellulose or carbon fibers or both to obtain a stronger film with a greater carbon content than that of a film spread on a metallic current collector. In fact, for an electrode (~6 mg of electrochemically active material/$cm^2$) spread on aluminum foil, the electrochemically active material (for example, LFP) represents 53% by weight, the binder and the electronically conductive material representing about 6% by weight, while the inactive aluminum foil represents 41% by weight of the total weight of the electrode.

Another advantage of the process described in Example 1(d) is the fact that the quantity of electrochemically active material can be fully known since it is weighed prior to being added to the beaker and filtered (see FIG. 1). Therefore, depending on the battery configuration or the cathode/anode materials used, the quantity of active material in mg/$cm^2$ in the self-standing film can be relatively easily adapted.

Example 3: Preparation of Electrochemical Cells

All electrochemical cells were assembled in an argon-filled glovebox with an oxygen content below 20 ppm, controlled with a $VMP_3$ potentiostat.

LR2032 button cell batteries with two electrodes were assembled with metallic lithium as a counter-electrode and as a reference electrode and a Celgard™-3501 separator or a Kodoshi™ paper separator impregnated with a liquid electrolyte comprising 1 M $LiPF_6$ in a mixture of EC:DEC (3:7 by volume).

Complete batteries comprising a self-standing positive electrode film and a self-standing negative electrode film (LFP/LTO or PTCDA/graphite) were assembled with Celgard™-3501 separators or Kodoshi™ paper separators impregnated with a liquid electrolyte comprising 1 M $LiPF_6$ in a mixture of EC:DEC (3:7 by volume).

All electrodes were punched into small circular disks (area=1.13 $cm^2$, see FIG. 2(C)) having a mass loading ranging from 8.4 to 11.2 mg/$cm^2$ depending on the quantity of electrochemically active material inserted in the film.

Bare or reference electrodes were also tested using a stainless steel spacer as a working electrode.

In order to verify the electrochemical inertness of cellulose fibers, hand-made paper electrodes were tested with lithium as a working electrode and a Celgard™-3501 separator or a Kodoshi™ paper separator impregnated with a liquid electrolyte comprising 1 M $LiPF_6$ in a mixture of EC:DEC (3:7 by volume).

Example 4: Electrochemical Properties (a) Cyclic Voltammetry Experimental Conditions Electrochemical properties of the reference electrode (stainless steel spacer alone), the paper electrode (composed of cellulose fibers) and the LFP, PTCDA and LTO self-standing electrodes were compared by cyclic voltammetry. A scan rate of 0.03 $mV \cdot s^{-1}$ was used between various potential windows.

For the reference electrode (stainless steel spacer alone) and the paper electrode (composed of cellulose fibers), the potential was scanned from open circuit potential (OCP) to 4.2 V followed by a reverse scan from 4.2 V to 2.0 V vs. $Li/Li^+$.

For LFP self-standing electrodes, the potential was scanned from open circuit potential (OCP) to 4.0 V followed by a reverse scan from 4.0 V to 2.0 V vs. $Li/Li^+$.

For PTCDA self-standing electrodes, the potential was scanned from open circuit potential (OCP) to 1.5 V followed by a reverse scan from 1.5 V to 3.5 V vs. $Li/Li^+$.

For the LTO self-standing electrodes, the potential was scanned from open circuit potential (OCP) to 1.2 V followed by a reverse scan from 1.2 V to 2.5 V vs. $Li/Li^+$.

(b) Galvanostatic Cycling and Long-Term Cycling Experimental Conditions

The charge and discharge cycles were performed in galvanostatic mode at different current densities between 2.0 and 4.0 V, between 1.5 and 3.5 V, between 0 and 1.5 V and between 1.2 and 2.5 V vs. $Li/Li^+$ respectively for LFP, PTCDA, graphite and LTO electrodes. Five cycles were recorded for each cycling rate ranging from C/10 to 5C and the experiment was automatically started with two formation cycles at C/24.

In addition, LFP/LTO electrochemical cells with LFP/LTO weight ratios ranging from 1 to about 0.85 were also tested between 1.0 and 2.5 V vs. LTO at different cycling rates ranging from C/24 to 5C.

Long-term cycling experiments at C/10, C/2, C and 2C cycling rates were also performed at various cycling rates for PTCDA/Li, graphite/Li, LTO/Li, LFP/LTO, LFP/LTO electrochemical cells, as well as LFP/graphite and PTCDA/graphite batteries directly after two formation cycles at C/24.

The prelithiation of PTCDA cathodes was carried out in button cells using lithium negative electrodes by performing a discharge at C/24 from the open circuit potential (OCP) to 1.5 V vs. $Li/Li^+$ followed by a chronoamperometry experiment at a constant potential of 1.5 V for 3 hours. The button cells were disassembled and the prelithiated PTCDA positive electrodes were recovered to be assembled with graphite negative electrodes.

(c) Electrochemical Results

All cyclic voltammograms were recorded using the experimental conditions described in Example 3(a) and all the galvanostatic cycling and long-term cycling experiments were recorded using the experimental conditions described in Example 3(b).

i. Electrochemical Properties of the Reference Electrode (Stainless Steel Spacer Alone) and the Paper Electrode (Made of Cellulose Fibers)

Figure 4:
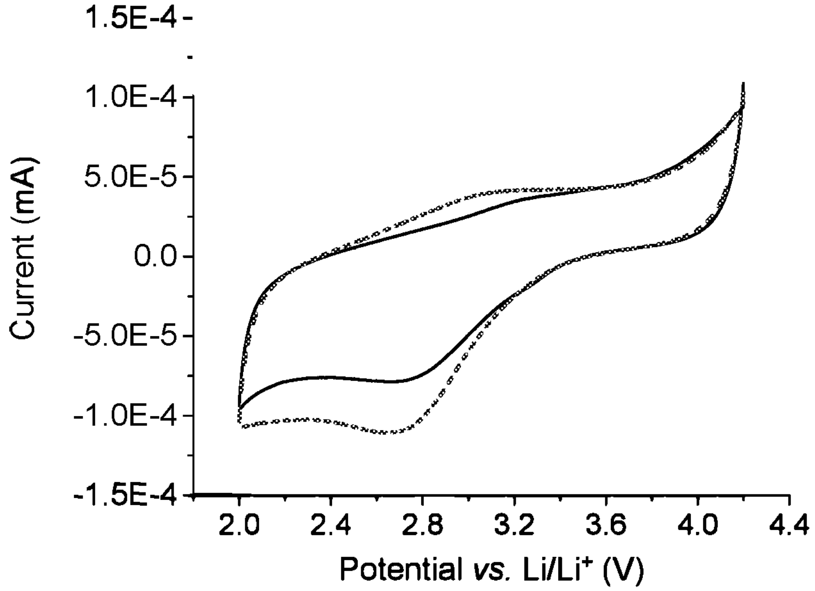
FIG. 4 shows the cyclic voltammetry results of a paper electrode (dashed line) and of a bare electrode (or reference) (solid line) as described in Example 3.
Figure 5:
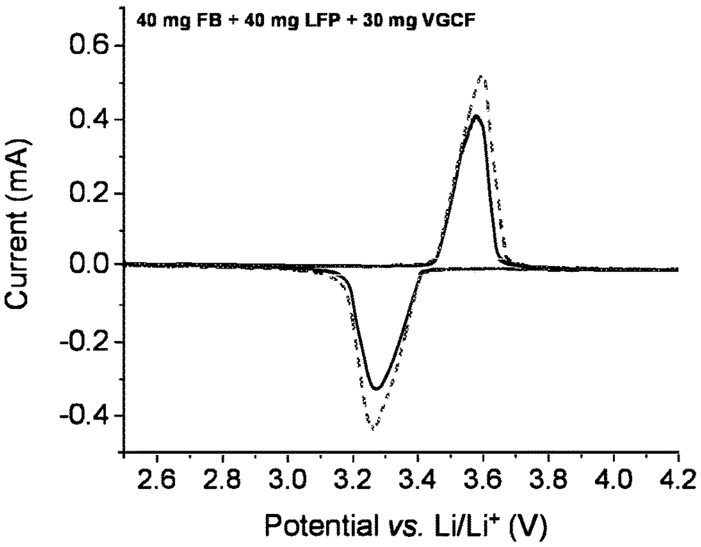
FIG. 5 presents the cyclic voltammograms of a self-standing electrode recorded with a self-standing electrode with an integrated paper separator as described in Example 1(e) (dashed line) and a self-standing electrode as described in Example 1(d) using a Celgard™ separator (solid line).

In order to verify that the unmodified cellulose fibers can be used as a support for the electrochemically active material in LIBs, a simple paper electrode entirely composed of cellulose fibers was prepared. This electrode was tested as a working electrode in a button cell vs. lithium metal. The cyclic voltammetry experiments, shown in FIG. 4, revealed that the cellulose fibers (dashed line) were electrochemically inactive up to a potential of 4.2 V, which makes this type of electrode potential candidates for a use in LIBs. As shown in FIG. 4, the electrochemical properties of the paper electrode in the potential window from 2 V to 4.2 V vs. $Li/Li^+$ were similar to the electrochemical properties of the reference electrode made of a stainless steel spacer serving as a working electrode (solid line). The currents recorded for the paper electrode and the reference electrode were about four orders of magnitude lower than those obtained with a self-sanding LFP electrode as shown in FIG. 5.

ii. Electrochemical Properties of Integrated Paper Separators

The integrated paper separators as described in Example 1(e) directly deposited on the electrode film as shown in FIG. 3(D) were also characterized by cyclic voltammetry to verify the influence of paper separators on the electrochemical properties. FIG. 5 shows cyclic voltammograms obtained for a self-standing LFP electrode with an integrated paper separator (discontinuous line) compared to self-standing LFP electrode with a Celgard™ separator (solid line). The cyclic voltammograms obtained showed that the integrated paper separator did not substantially negatively affect the electrochemical properties of the self-standing LFP electrode, polarizations (ΔE) for the two electrodes being similar.

Figure 6A:
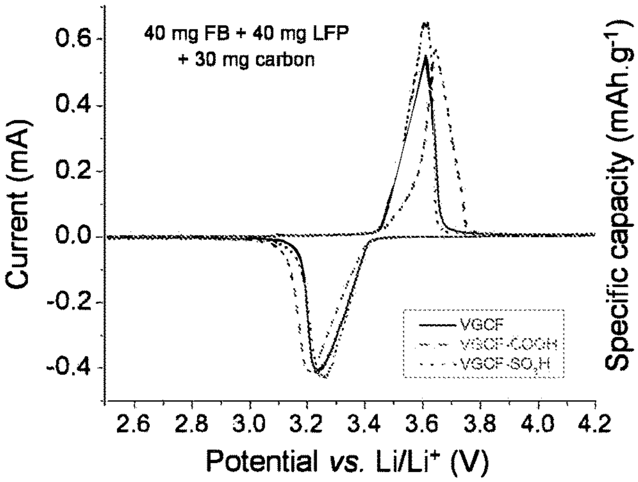
FIGS. 6(A)-6(B) shows results from (A) the cyclic voltammetry; and (B) the capacity versus cycle number at charge and discharge rates between C/10 and 5C, obtained with three self-standing electrodes respectively containing unmodified VGCFs, VGCFs-COOH, and VGCFs-$SO_3H$. Full and empty symbols are used in (B) to represent the charge and the discharge results, respectively.
Figure 6B:
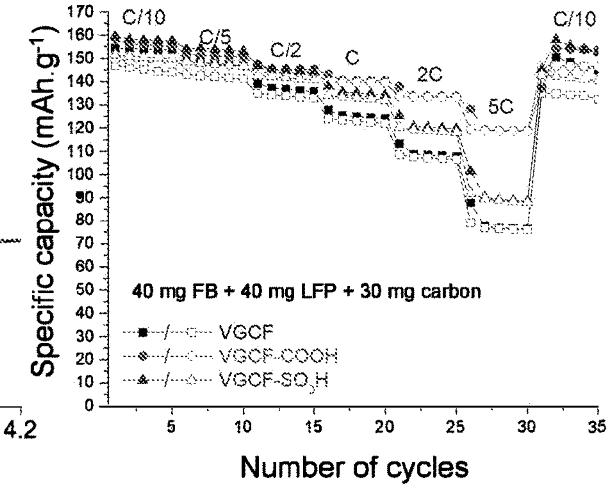
Figures 7A, 7B:
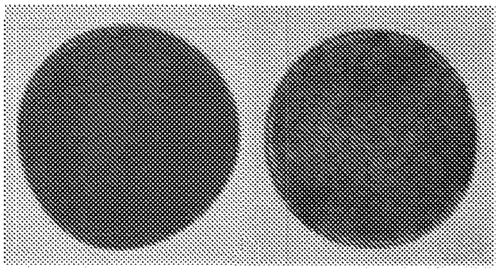
FIGS. 7(A)-7(B) shows photographs in (A) of the self-standing LFP electrode comprising unmodified VGCFs, and in (B) of the self-standing LFP electrode comprising VGCFs-COOH.
Figure 8A:
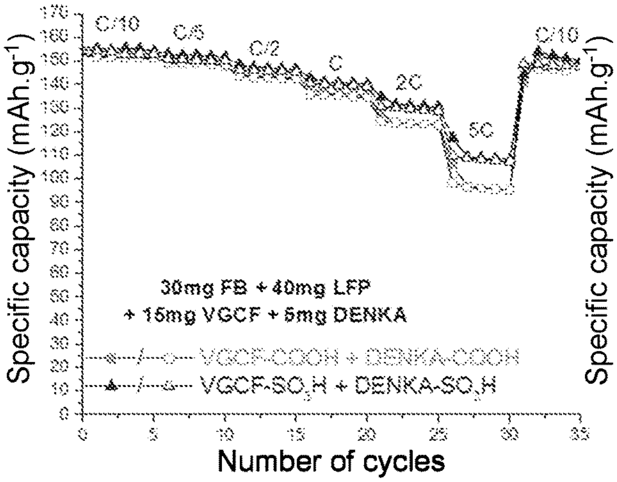
FIGS. 8(A)-8(B) presents the capacity versus cycle number results at charge/discharge rates between C/10 and 5C recorded with (A) a combination of VGCFs-COOH and Denka-COOH or a combination of VGCFs-$SO_3H$ and Denka-$SO_3H$; and (B) a combination of VGCFs-COOH and CNTs-COOH or a combination of VGCFs-$SO_3H$ and CNTs-$SO_3H$. Full and empty symbols are used to represent the charge and discharge results, respectively.
Figure 8B:
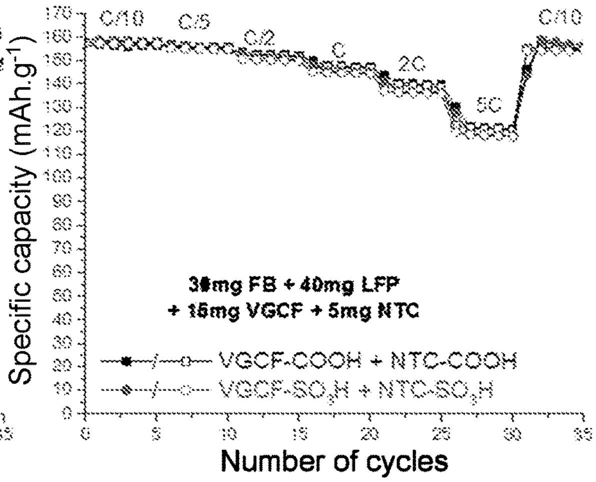

In addition, the intensity of redox peaks recorded with a self-standing LFP electrode with an integrated paper separator was slightly greater than for self-standing LFP electrode with a Celgard™ separator. This result may be explained by the improvement of the mechanical properties and increased integrity of the film.

iii. Effect of Using Modified Versus Unmodified Second Electronically Conductive Materials on Electrochemical Properties of Self-Standing LFP Electrodes FIG. 6(A) presents the cyclic voltammetry results and FIG. 6(B) presents the specific capacity results recorded with three self-standing LFP electrodes having the same loading of electrochemically active material and obtained by the same process. However, three different carbons were used, namely unmodified VGCFs (solid line), VGCFs-COOH (dashed line) and VGCFS—$SO_3H$ (dashed line). As shown in FIG. 6(A), the cyclic voltammograms were similar. However, the specific capacity results presented in FIG. 6(B) show a substantial electrochemical performance improvement for the self-standing electrodes including modified carbon, which is particularly apparent at cycling rates of 2C and 5C. At a lower current density (for example, C/10), discharge capacities for the three self-standing LFP electrodes were similar and of about 155 $mAh{\cdot}g^{-1}$. When the cycling rate was increased to 1C, the discharge capacity remained at about 140 $mAh{\cdot}g^{-1}$ for both self-standing LFP electrodes comprising the modified VGCFs, while a capacity of about 120 $mAh{\cdot}g^{-1}$ was obtained using unmodified VGCFs. This capacity corresponds to the discharge capacity obtained at a rate of 5C for both modified self-standing LFP electrodes. The improved electrochemical performance may be attributed to the hydrophilic nature of the substituents, which would allow the carbon to better fill the porosity created by the cellulose fibers. FIG. 7 shows photographs in (A) of the self-standing LFP electrode comprising unmodified VGCFs, and in (B) of the self-standing LFP electrode comprising VGCFs-COOH. FIG. 7(B) shows that the cellulose fibers were visible on the surface of the electrode leading to a stronger film with the electrochemically active material and the second electronically conductive material trapped in the cellulose fibers. Thus, at 5C, about 50% and 77% of the initial discharge capacity was recovered when unmodified VGCFs and VGCFs-COOH were used, respectively.

iv. Effect of the Second Electronically Conductive Material'S Nature on the Electrochemical Properties of Self-Standing LFP Electrodes In the electrode composition, 50% by weight of the amount of second electronically conductive material (VGCFs) was replaced with another carbon type (for example, by Denka™ or by CNTs). FIG. 8 compares the specific capacity of self-standing electrodes comprising different mixtures of modified carbons. FIG. 8(A) shows the results for a combination of VGCFs-COOH and Denka-COOH (squares) and the results for a combination of VGCFs-$SO_3H$ and Denka-$SO_3H$ (triangles). FIG. 8(B) shows the results for a combination of VGCFs-COOH and CNTs-COOH (squares) and the results for a combination of VGCFs-$SO_3H$ and CNTs-$SO_3H$ (circles). In both cases, the use of Denka™ (see FIG. 8(A)) reduced the electrochemical performance of the lithium-ion films. However, an improvement in electrochemical performance was observed when 50% by weight of the amount of second electronically conductive material was replaced with CNTs. Particularly, the specific capacity obtained at a cycling rate of 1C is about 140 $mAh{\cdot}g^{-1}$ when Denka™ carbon is used, while the same capacity was obtained for the self-standing LFP electrodes comprising modified CNTs at 2C (see FIG. 8(B)). With respect to the use of modified CNTs, a slight improvement in electrochemical performance was observed compared to self-standing LFP electrodes comprising exclusively VGCFs as the second electronically conductive material.

v. Effect of Calendering Temperature on Electrochemical Properties

Figure 9A:
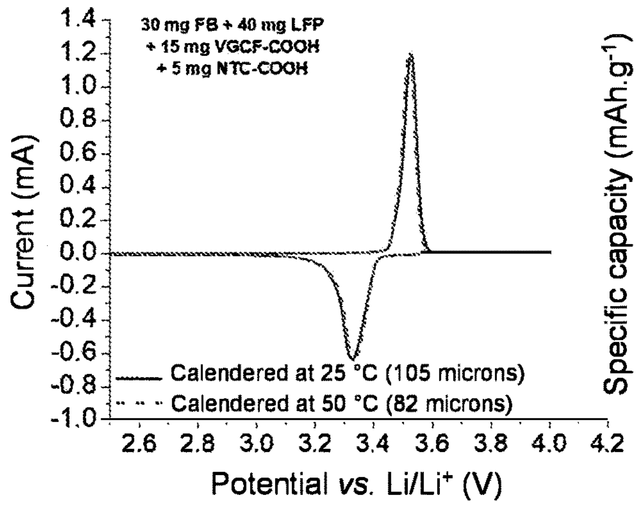
FIGS. 9(A)-9(B) shows in (A) the cyclic voltammetry results; and in (B) the capacity versus cycle number results at charge and discharge rates between C/10 and 5C, obtained with two LFP electrodes comprising a mixture of VGCFs-COOH and CNTs-COOH carbons, one calendered at a temperature of 25° C. and the other at 50° C. Full and empty symbols are used in (B) to represent the charge and discharge results, respectively.
Figure 9B:
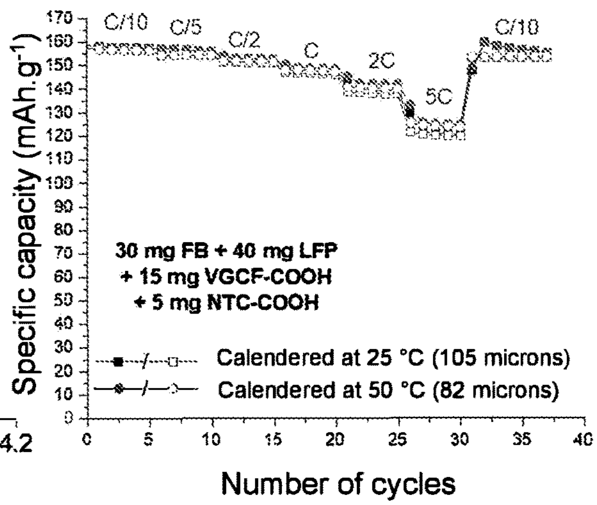

The effect of calendering the self-standing LFP electrodes at different temperatures has also been studied. FIG. 9(A) presents the cyclic voltammetry results and FIG. 9(B) presents the capacity versus cycle number results of the same electrode calendered at a temperature of 25° C. and a temperature of 50° C. FIG. 9(A) shows excellent reproducibility for the two self-standing LFP electrodes calendered at different temperatures. Although only the results of self-standing LFP electrodes comprising a combination of VGCFs-COOH and CNTs-COOH as the second electronically conductive material are presented, high reproducibility was also demonstrated whether the LFP electrode comprised CNTs, Denka™ carbon or VGCFs.

Figure 10:
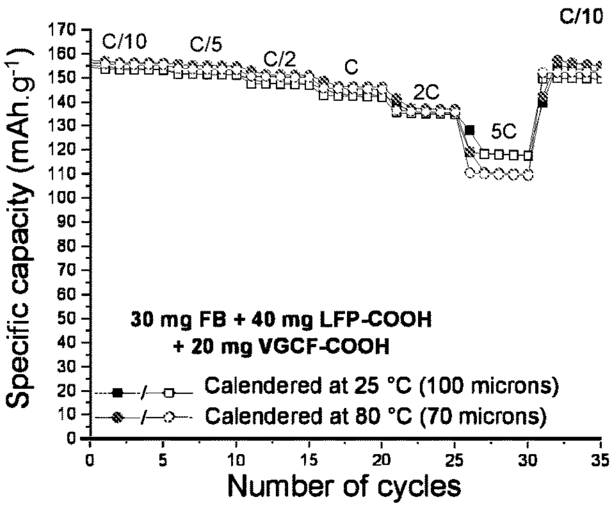
FIG. 10 shows the capacity versus cycle number results at charge and discharge rates between C/10 and 5C for LFP electrodes made with the modified LFP—COOH material and calendered at 25° C. and at 80° C. Full and empty symbols are used to represent the charge and discharge results, respectively.

In addition, as shown in FIGS. 9(B) and 10, the specific capacity obtained for electrodes calendered at a temperature of 50° C. or 80° C. is slightly higher than that of electrodes calendered at a temperature of 25° C. This result may be attributed to a better electronic contact and a better conductivity between the electrochemically active material and the second electronically conductive material within the film.

Finally, the thickness of the self-standing electrode decreases with increasing calendering temperature. Thus, a thickness of about 100 μm was generally obtained at a calendering temperature of 25° C., while a thickness of about 80 μm and about 70 μm was obtained at calendering temperatures of 50° C. and 80° C., respectively. The nature of the electronically conductive material does not seem to have a significant effect on the thickness after calendering, which rather seems to be mainly influenced by the amount of cellulose fibers used.

vi. Effect of Surface Modification of the Electrochemically Active Material on the Electrochemical Properties of Self-Standing LFP Electrodes The use of water-soluble carbons has proved to be particularly interesting for obtaining improved electrochemical performance and to reduce preparation time. In the same line of thoughts, the surface of the electrochemically active material (for example, C-LFP) was grafted with at least one aryl group comprising a hydrophilic functional group (for example -aryl-COOH) following the procedure described in Example 1(c). FIG. 10 presents the electrochemical performance of two LFP electrodes of different thicknesses made with the modified LFP—COOH material.

Recent work has indicated that high loading of grafted groups may lead to lower specific capacities (see Delaporte, N. et al., *ACS applied materials & interfaces,* 7(33), 18519-18529; and Delaporte, N. et al., *Journal of Power Sources,* 280, 246-255). However, the specific capacities for the unmodified and modified LFP according to the present process were advantageously similar. Therefore, the grafting of organic species did not significantly adversely affect electrochemical performance. Although not evaluated, this may be attributed to a very low number (<1% by weight) of grafted groups.

It was therefore demonstrated that the modification of the surface of carbon and LFP—COOH allows a resistant self-standing film to be produced in less than about 10 minutes by simply mixing in an aqueous solution.

vii. Electrochemical Properties of Self-Standing LTO Electrodes

Self-standing negative electrodes were also prepared using a similar process. More precisely, $Li_4Ti_5O_{12}$ (LTO) is an electrochemically active material of interest for application in LIBs. Due to its operating voltage being at a sufficiently high potential (1.55 V vs. $Li/Li^+$), this material does not form a solid electrolyte interphase (SEI) layer. Moreover, LTO is referred to as a zero-strain material since it remains stable during the insertion and de-insertion of lithium ions (see Zaghib, K. et al., *Journal of Power Sources,* 248, (2014): 1050-1057). Similar to LFP, LTO is a relatively inexpensive material and thus an ideal candidate for low cost LIBs.

Figure 11A:
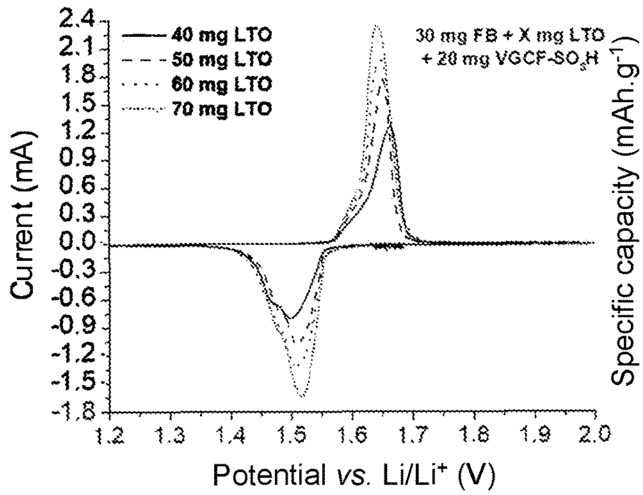
FIGS. 11(A)-11(B) presents (A) the cyclic voltammetry results; and (B) the capacity versus cycle number results at charge and discharge rates between C/10 and 5C, obtained with four electrodes comprising different amounts of LTO and VGCFs-$SO_3H$. Full and empty symbols are used in (B) to represent the charge and discharge results, respectively.
Figure 11B:
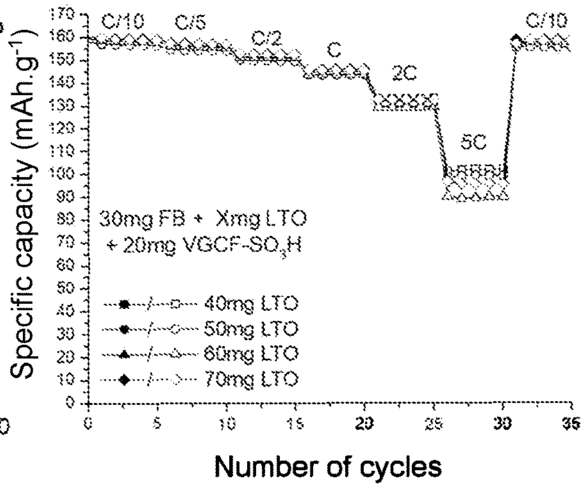
Figure 12A:
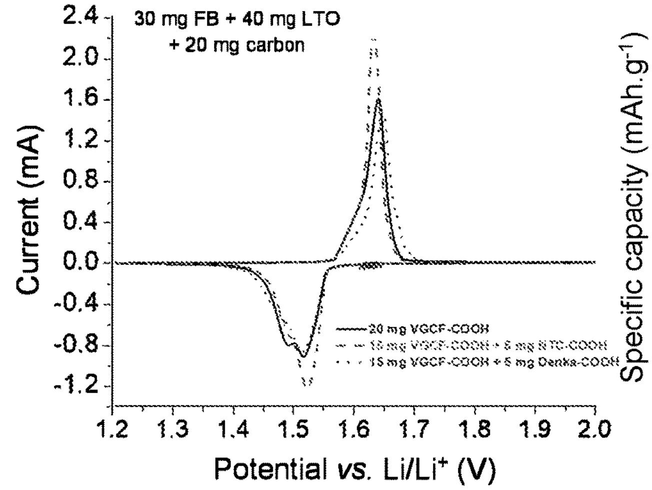
FIGS. 12(A)-12(B) shows results from (A) the cyclic voltammetry; and (B) the capacity versus cycle number at charge and discharge rates between C/10 and 5C, obtained with three different LTO electrodes comprising VGCFs-COOH, a mixture of VGCFs-COOH and CNTs-COOH, or a mixture of VGCFs-COOH and Denka-COOH. Full and empty symbols are used in (B) to represent the charge and discharge results, respectively.
Figure 12B:
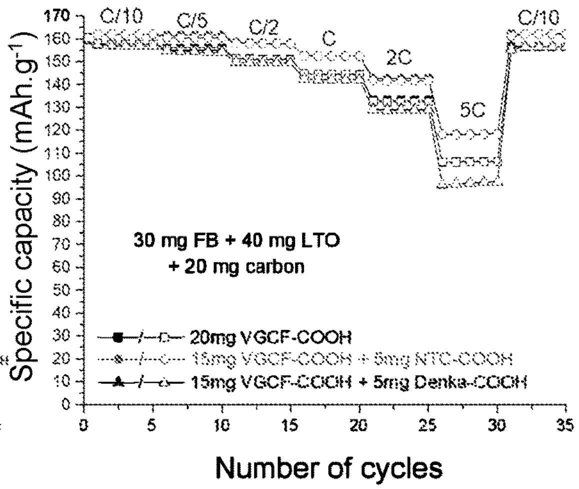
Figure 13:
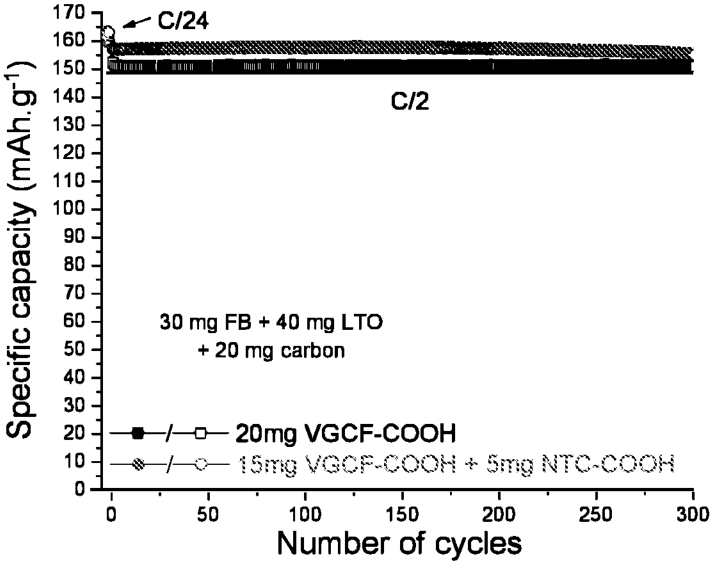
FIG. 13 shows the specific capacity results over 300 cycles at a constant charge/discharge current of C/2 between 1.2 and 2.5 V vs. $Li/Li^+$ recorded with two LTO electrodes, one containing VGCFs-COOH, the other containing a mixture of VGCFs-COOH and CNTs-COOH. Full and empty symbols are used to represent the charge and discharge results, respectively.

Self-standing LTO films with different loadings were prepared following the process described in FIG. 1. The cyclic voltammetry and specific capacity results are presented in FIG. 11. As shown in FIG. 11(A), when the film loading increases, the intensity of oxidation and reduction peaks on the voltammogram also increases. Since the oxidation peak and reduction peak increase proportionally in each case, polarization remains unchanged. This electrochemical property demonstrates that this manufacturing technique is adapted for the use of electrochemically active material high loadings. Furthermore, the corresponding specific capacities, shown in FIG. 11(B), were very similar up to a cycling rate of 2C. At this cycling rate, a capacity of 135 $mAh \cdot g^{-1}$ was obtained, which represents about 85% of the initial discharge capacity of 160 $mAh \cdot g^{-1}$. Slight variations in capacity were observed at 5C between electrodes of different loadings, but a capacity of about 90 to 100 $mAh \cdot g^{-1}$ was recovered.

viii. Effect of the Nature of the Second Electronically Conductive Material on Electrochemical Properties of Self-Standing LTO Electrodes In the electrode composition, 50% by weight of the amount of second electronically conductive material (VGCFs) was replaced with another carbon type (for example, Denka™ or CNTs). Electrochemical performance of such electrodes are shown in FIG. 12. As indicated in FIG. 12(A), cyclic voltammetry experiments revealed more intense and sharp oxidation and reduction peaks when a combination of VGCFs-COOH and CNTs-COOH was used (dashed line) in comparison with a combination of VGCFs-COOH and Denka™-COOH (dotted line) or with the control comprising only VGCFs-COOH (solid line) as the conductive material. FIG. 12(B) presents the cycling experiments at different cycling rates. Capacities of about 120, 105 and 95 $mAh \cdot g^{-1}$ were obtained at a cycling rate of 5C respectively for LTO electrodes obtained with a combination of VGCFs-COOH and CNTs-COOH (circles), the control comprising VGCFs-COOH alone (squares) and a combination of VGCFs-COOH and Denka™-COOH (triangles). Similar results were obtained when the -aryl-COOH groups were replaced with -aryl-$SO_3H$ (not shown in FIG. 12). Similar to LFP electrodes cycling results shown in FIG. 8, the addition of Denka™ carbon decreased the electrochemical performance of the LTO electrodes. However, once again, an improvement in electrochemical performance was observed when a small amount (50% by weight of the amount of second electronically conductive material) of modified CNTs was added particularly at high cycling rates.

ix. Effect of the Nature of the Second Electronically Conductive Material on Long-Term Cycling Results of Self-Standing LTO Electrodes The cycling of LTO self-standing electrodes was evaluated with long-term cycling experiments at C/2. FIG. 13 presents the capacity retention over 300 charge and discharge cycles for two different LTO electrodes, one comprising VGCFs-COOH alone and the other comprising a combination of VGCFs-COOH and CNTs-COOH. Nearly 100% of the initial discharge capacity at C/2 was maintained after the $300^{th}$ cycle. Thus, capacities of about 157 and 150 $mAh \cdot g^{-1}$ were obtained for several hundred cycles at C/2 when the electrode respectively comprised a combination of VGCFs-COOH and CNTs-COOH (circles) and VGCFs-COOH alone (squares).

x. Preparation of Complete LIBs Comprising Self-Standing LFP and LTO Electrodes for Electrochemical Properties Evaluation Complete LIBs were assembled with self-standing LFP and LTO electrodes. The negative electrode electrochemically active material (LTO) was in its delithiated state and can insert three lithium ions according to equation (1) (see Zaghib, K. et al., *Journal of Power Sources*, (1999) 81, 300-305):

$$3LiFePO_4+Li_4Ti_5O_{12} \rightarrow 3FePO_4+Li_7Ti_5O_{12} \quad (1)$$

Figure 14:
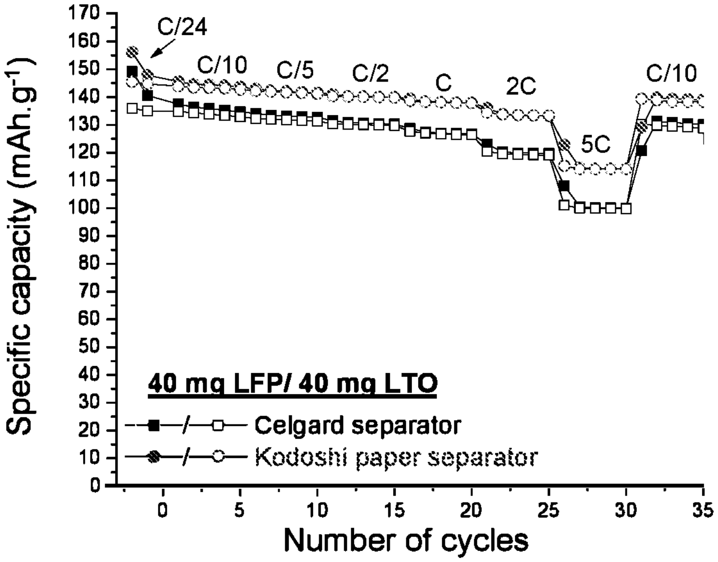
FIG. 14 shows the capacity versus cycle number results at charge and discharge rates between C/24 and 5C, for LFP/LTO batteries (weight ratio=1) with Celgard™ polymer and Kodoshi™ paper separators. Full and empty symbols are used to represent the charge and discharge results, respectively.
Figure 15:
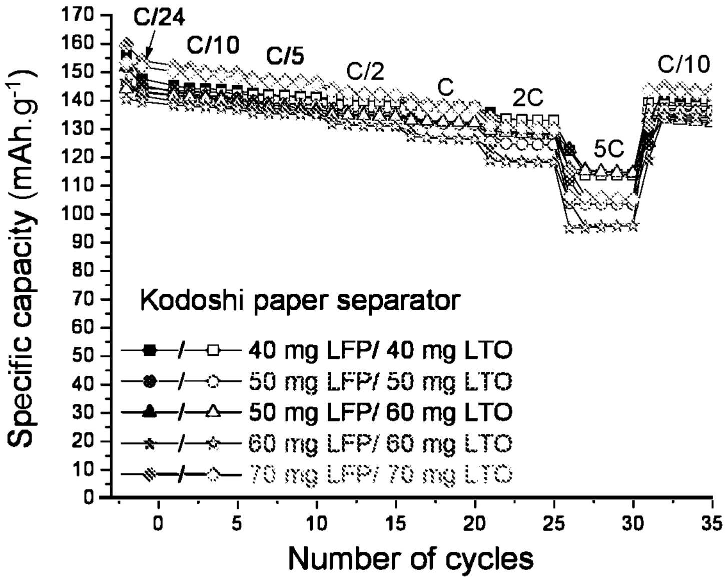
FIG. 15 shows the capacity versus cycle number results at charge and discharge rates between C/24 and 5C, for LFP/LTO batteries made with different amounts of LFP and LTO and LFP/LTO weight ratios of 1 or about 0.85. Kodoshi™ paper separators were used for all electrodes. Full and empty symbols are used to represent the charge and discharge results, respectively.

Since the specific capacity of 165 $mAh \cdot g^{-1}$ for the LTO self-standing electrode is slightly higher than the specific capacity of 160 $mAh \cdot g^{-1}$ obtained for the LFP self-standing film, electrochemical cells with LFP/LTO mass ratios of about 1 may be used. However, a slight excess of LTO material (LFP/LTO ratio of about 0.85) was used for safety concerns, as generally used in commercial batteries.

xi. Effect of the Separator on Electrochemical Properties of Complete LIBs Comprising Self-Standing LFP and LTO Electrodes FIG. 14 presents the specific capacity of two LFP/LTO batteries with the same amount of electrochemically active material for both electrodes but with a different separator. The discharge capacities obtained were higher when a Kodoshi™ paper separator (circles) was used instead of a conventional Celgard™ separator (squares). An increase of 10 $mAh \cdot g^{-1}$ was thus obtained for the battery entirely made of paper for each cycling rate ranging from C/24 to 2C in comparison to the cell assembled with a Celgard™ separator. Thus, 100 and 115 $mAh \cdot g^{-1}$ were obtained at 5C respectively for the battery using the Celgard™ separator and the paper separator. The improved electrochemical performance obtained with a paper separator could reduce the price of energy storage devices by replacing the Celgard™ separator with a paper separator.

xii. Effect of LFP/LTO Weight Ratio on Electrochemical Properties of Complete LIBs Since the electrochemical performance is significantly improved with a paper separator, several other LFP/LTO batteries containing different amounts of electrochemically active material and a Kodoshi™ paper separator were assembled. Complete LIBs with masses of LFP and LTO between 40 and 70 mg were obtained using the process illustrated in FIG. 1. Complete LIBs with LFP/LTO weight ratios of 1 and about 0.85 were electrochemically tested. Specific capacities for these electrodes are reported in FIG. 15. As shown by the latter, the results show no significant difference when an excess of LTO is used. However, a significant improvement is visible when the battery is used at higher cycling rates. In fact, at 5C for the two electrodes made with 50 mg of LFP, the specific capacities obtained were of about 105 and about 115 $mAh \cdot g^{-1}$ when an LFP/LTO weight ratio of 1 and 0.85 was used, respectively. Thus, under these conditions, a better capacity retention at high cycling rates was obtained for LIBs with an LTO excess. FIG. 15 also shows that the specific capacities obtained were slightly lower when the loadings of negative and positive electrodes increased, particularly at higher cycling rates. For example, the battery assembled with electrode films comprising 40 mg of LFP and 40 mg of LTO (squares) delivered 135 $mAh \cdot g^{-1}$ at 2C, while 125 $mAh \cdot g^{-1}$ (circles) and less than 120 $mAh \cdot g^{-1}$ (stars) were obtained when the films comprising 50 mg of LFP and LTO and 60 mg of LFP and LTO were used, respectively. The same behavior was observed at 5C since 115 $mAh \cdot g^{-1}$, 105 $mAh \cdot g^{-1}$ and 95 $mAh \cdot g^{-1}$ were obtained for the electrode films containing 40, 50 and 60 mg of electrochemically active material, respectively.

xiii. Effect of the Separator on Long-Term Cycling Experiments on Complete LIBs Comprising Self-Standing LFP and LTO Electrodes The cyclability of complete LFP/LTO batteries was evaluated with long-term cycling experiments at C/2 after several formation cycles at C/24, C/10 and C/5. FIG. 16(A) presents the capacity retention over 200 charge and discharge cycles for the same battery composition, but assembled with Celgard™ (square) and Kodoshi™ (circle) separators. As shown in FIG. 16(A), the use of a Kodoshi™ paper separator allowed to increase the specific capacities. About 140 and about 130 $mAh \cdot g^{-1}$ were obtained for the first cycle at C/2 when a paper separator and a Celgard™ separator were used, respectively. After 200 cycles, about 92% of the initial discharge capacity was recovered. FIG. 16(A) shows that the paper separator did not significantly improve the capacity retention although the specific capacities remained higher. In both cases, a gradual loss of capacity during cycling was observed, which may be attributed to LFP. Similar observations were reported for electrodes made with sub-micrometer LFP plates (see Yang, X F et al., ChemSusChem, (2014) 7 (6), 1618-1622) and with reduced-size LFP particles cycled at 1C (Lux, S F et al., Journal of the Electrochemical Society (2010) 157.3, A320-A325).

xiv. Long-Term Cycling Experiments on Complete LIBs Comprising Self-Standing LFP and LTO Electrodes and Kodoshi™ Paper Separators Long-term cycling experiments for several LIBs comprising both electrodes assembled with paper separators and self-standing negative and positive electrodes prepared according to the process described in Example 1(d) were recorded at C/2. As shown in FIG. 16(B), the LIBs of these experiments comprised different amounts of LFP and LTO. As can be seen in FIG. 16(B), the increase in electrochemically active material loading seems to have a significant effect on the capacity retention and on the initial discharge capacity which was slightly higher.

The effect of an increase in active material loadings on the capacity retention and on the initial discharge capacity was confirmed with long cycling experiments performed at a 2C rate (FIG. 17). Initial discharge capacities of 121 $mAh \cdot g^{-1}$ and 130 $mAh \cdot g^{-1}$ were obtained respectively with LFP/LTO batteries comprising 40 and 70 mg of LFP with LFP/LTO weight ratios of 1. After 1000 charge and discharge cycles, about 84% and 92% of the initial discharge capacities were recovered for the battery with 40 mg of LFP and LTO and 70 mg of LFP and LTO, respectively.

xv. Electrochemical Properties of Self-Standing PTCDA Electrodes

The electrochemical properties of self-standing PTCDA electrodes were evaluated. FIG. 18 shows cyclic voltammetry results and specific capacity for self-standing PTCDA electrodes with metallic lithium as counter-electrode and reference electrode. As shown in FIG. 18(A), the cyclic voltammetry results revealed that an increase in PTCDA mass in the self-standing electrode causes an increase in polarization although the redox peak intensity increases slightly in the voltammogram. This behavior was confirmed by specific capacity results as a function of the number of cycles (see FIG. 18(B)).

During the discharge of self-standing PTCDA electrodes, the voltage drops suddenly. The initial drop from the open circuit potential (OCP) to a plateau at about 2.4 V vs. $Li/Li^+$ may be attributed to the transition from PTCDA to lithium enolate with the integration of $Li^+$ ions. However, the specific capacity obtained was about 137 $mAh \cdot g^{-1}$, corresponding to half of the theoretical value, since only two lithium ions react with the ketone functions. Insertion of the other two $Li^+$ rather occurs within the potential window ranging from 0.9 to 1.3 V vs. $Li/Li^+$. Nevertheless, a deep discharge process may damage the structure and thus cause strong irreversibility.

When the self-standing PTCDA electrodes were cycled at rates above 1C (FIG. 18(B)), discharge capacities decreased significantly with an increase in active mass loading. Thus, capacities of approximately 110, 60 and only 35 $mAh \cdot g^{-1}$ were obtained at 5C for self-standing PTCDA electrode films comprising 40, 50 and 60 mg of electrochemically active material, respectively. However, these electrochemical performances are greater than those generally reported for electrodes spread on an aluminum current collector. For example, following the new manufacturing process, it was possible to deliver 120 $mAh \cdot g^{-1}$ at 1C with a self-standing PTCDA electrode of about 6 $mg \cdot cm^{-2}$.

xvi. Effect of a Second Electronically Conductive Material on Long-Term Cycling Experiments on Self-Standing PTCDA Electrodes The cyclability of self-standing PTCDA electrodes was evaluated with long cycling experiments at C/10 after several cycles at different cycling rates ranging from C/24 to 5C. FIG. 19 presents discharge capacity and coulombic efficiency results as a function of the number of cycles for over 100 charge and discharge cycles for the same self-standing PTCDA electrode composition, with the exception of the second electronically conductive material composition. FIG. 19(A) shows the results for a self-standing PTCDA electrode comprising VGCFs-COOH as the second electronically conductive material and FIG. 19(B) for the same self-standing PTCDA electrode composition but comprising a mixture of VGCFs-$SO_3H$ with a small quantity of CNTs-$SO_3H$. As PTCDA has a low electronic conductivity, the use of a high quantity of conductive carbon in the electrode composition may be necessary to reach good electrochemical performance. When a quantity of CNTs-$SO_3H$ was added (FIG. 19(B)), a capacity of about 110 $mAh \cdot g^{-1}$ was obtained at 5C while a capacity of only 80 $mAh \cdot g^{-1}$ was delivered for the electrode only composed of VGCFs-COOH as a second electronically conductive material (FIG. 19(A)).

As shown in FIG. 19, the coulombic efficiency (%) significantly decreases with the number of cycles. FIGS. 19(A) and 19(B) also show a zoom of the first 40 cycles. In both cases, the coulombic efficiency gradually decreases until reaching, for example, 85% after 4 cycles and after 12 cycles at low cycling rates respectively for self-standing electrodes without (FIG. 19(A)) and with (FIG. 19(B)) a small amount of CNTs-$SO_3H$. As shown in FIG. 19(B), the coulombic efficiency is strongly improved by increasing the cycling rate.

xvii. Effect of Formation Cycles on Long Cycle Experiments Carried Out with Self-Standing PTCDA Electrodes The effect of formation cycles on the cyclability was also evaluated. After 5 cycles at 5C, the long cycling experiments at C/10 were started and the coulombic efficiency reached about 100%. A good stability over 100 cycles was observed since 84% and 91% of the initial discharge capacity at C/10 were obtained at the end of the long-term cycling experiments respectively for electrodes comprising VGCFs-COOH (FIG. 19(A)) and the mixture of VGCFs-$SO_3H$ and CNTs-$SO_3H$ as the second electronically conductive material (FIG. 19(B)). Incorporation of CNTs-$SO_3H$ improved stability, probably mainly because of the higher electronic conductivity of the positive electrode film.

Cyclability of the PTCDA self-standing electrodes shown in FIG. 19 was evaluated with long cycling experiments at C/10 but without performing multiple charge and discharge cycles at low and moderate cycling rates (C/10 to 2C). FIG. 20 shows the capacity retention over 100 cycles of charge and discharge for these two electrodes. It was shown that a rapid formation (5 cycles at 5C) allowed to prevent the migration of PTCDA into the electrolyte and that the coulombic efficiency remained close to 100% throughout the cycling experiment.

As shown in FIG. 20, a rapid formation (5 cycles at 5C) did not have any significant impact on the cyclability. Indeed, 80% and 91% of the initial discharge capacity at C/10 were obtained after 70 cycles of charge and discharge at C/10 for electrodes comprising VGCFs-COOH (squares) and for the mixture of VGCFs-$SO_3H$ and CNTs-$SO_3H$ (circles). These values were similar to those calculated for the galvanostatic cycling experiments in FIG. 19. Therefore, the addition of a small amount of CNTs-$SO_3H$ in the electrode composition significantly improves the discharge capacity but also the cyclability over 100 cycles. The rapid loss of capacity observed after 80 charge and discharge cycles for the self-standing film including VGCFs-COOH as the second electronically conductive material may be due to the degradation of the metallic lithium negative electrode.

xviii. Effect of PTCDA Loadings on Long Cycling Experiments Recorded with Self-Standing PTCDA Electrodes The cyclability of PTCDA self-standing electrodes with higher electrochemically active material loadings, i.e. comprising 50 and 60 mg of active material, was also studied. FIG. 21 compares the cyclability at C/10 over 100 cycles for three PTCDA electrodes with different electrochemically active material loadings. Similar to the results shown in FIG. 18, when the loading of active material was increased, the discharge capacity obtained at high cycling rates, and particularly at 5C, decreased significantly due to the higher resistance of the positive film. A retention of 91, 92 and 92% of the initial discharge capacity at C/10 were obtained after 70 charge and discharge cycles for the electrodes comprising 40, 50 and 60 mg of electrochemically active material, respectively.

However, rapidly after these 70 cycles, the specific capacity suddenly decreased for self-standing films comprising 50 mg (circles) and 60 mg (triangles) of PTCDA. For example, the gradual capacity loss could mainly be related to the degradation of the metallic lithium negative electrode.

xix. Effect of the Nature of the Second Electronically Conductive Material on Electrochemical Properties of Self-Standing Graphite Electrodes As shown in FIG. 22, long-term cycling experiments at C/10 were performed for self-standing graphite electrodes comprising 40 mg of graphite and VGCFs-$SO_3H$ (squares) or a mixture of VGCFs-$SO_3H$ and CNTs-$SO_3H$ (circles) as the second electronically conductive material. As generally observed for graphite, during the first cycle, the coulombic efficiency was greater than 100% and reached 120 and 145% when VGCFs-$SO_3H$ alone and the mixture of VGCFs-$SO_3H$ and of CNTs-$SO_3H$ were used as the second electronically conductive material, respectively.

The use of modified CNTs (CNTs-$SO_3H$) significantly increased the specific surface area of the negative composite electrode and thus led to further degradation of the electrolyte and degradation of the metallic lithium negative electrode. However, the higher electronic conductivity of the self-standing film comprising modified CNTs provides better stability during cycling and allows to deliver an additional 75 $mAh \cdot g^{-1}$ compared to an electrode without modified CNTs. A gradual loss of capacity during cycling was observed for both electrodes, this being greater for the negative composite electrode without CNTs.

xx. Effect of Surface Modification of the Electrochemically Active Material on Electrochemical Properties of Self-Standing Graphite Electrodes FIG. 23(A) presents long cycling experiments for two graphite electrodes with different loadings (30 and 40 mg of active material). As suggested by the results in FIG. 22, the decrease in capacity may be related to the resistance of the self-standing film. The resistance of the film may be proportional to the quantity of graphite used in the manufacture of said self-standing film. Thus, with a self-standing film comprising 30 mg of graphite, the initial discharge capacity at C/10 was about 380 $mAh \cdot g^{-1}$, which is substantially close to the theoretical capacity of graphite. The capacity loss during the cycle was also less pronounced for self-standing electrodes comprising 30 mg of graphite than for self-standing electrodes comprising 40 mg of graphite.

FIG. 23(B) presents the cyclability of three electrodes prepared with graphite modified with aryl-$SO_3H$. By comparing FIGS. 23(A) and 23(B), the discharge capacity for similar active material loadings were significantly higher for the self-standing graphite electrodes modified with $SO_3H$ groups than for the unmodified self-standing graphite electrodes. A discharge capacity of 335 and 405 $mAh \cdot g^{-1}$ were obtained for the first discharge at C/10 for a self-standing electrode comprising 40 mg of graphite and for a self-standing electrode comprising 40 mg of graphite-$SO_3H$, respectively. Increasing the active material loading up to 50 mg made it possible to improve the cyclability and the specific capacity.

As shown in FIG. 23, —$SO_3H$ groups attached to the carbon surface increase the overall capacity of the battery. These groups may, for example, contribute to lithium storage and to the increase of ionic conductivity. As shown in FIG. 23, the coulombic efficiency was slightly lower during the first cycle at C/24 when modified graphite was used.

xxi. Electrochemical Properties of Complete LIBs Comprising Self-Standing LFP and Graphite Electrodes Complete LFP/graphite batteries were assembled. The charge and discharge profile for the first cycle at C/24 for the LIBs is shown in FIG. 24(A). A flat plateau around 3.25 V was obtained with a small polarization. The first discharge delivered approximately 125 $mAh \cdot g^{-1}$. As shown in FIG. 24(A), the high irreversibility leads to a coulombic efficiency of 76% for the first cycle but reaches about 100% for the following cycles at 1C. Long-term cycling experiments were also performed over 300 cycles at 1C. FIG. 24(B) presents the stability for LFP/graphite LIBs. After 300 charge and discharge cycles, the specific capacity was about 88 $mAh \cdot g^{-1}$, which corresponds to 85% of the initial discharge capacity obtained at 1C. Although the coulombic efficiency remained constant at about 100% throughout the entire experiment, a gradual decrease in capacity was noticeable.

xxii. Electrochemical Properties of Complete LIBs Comprising Self-Standing PTCDA and Graphite Electrodes All-organic PTCDA/graphite LIBs (without transition metal), comprising self-standing PTCDA and graphite electrodes were prepared and electrochemically tested. All-organic PTCDA/graphite LIBs comprising organic redox molecules and biodegradable components. These all-organic PTCDA/graphite LIBs demonstrate the concept of inexpensive and biodegradable batteries.

Since the PTCDA was in its oxidized form, a first prelithiation step was necessary. Prelithiation was performed by assembling PTCDA self-standing films with lithium counter electrodes in button cells. FIG. 25(A) shows the first discharge up to 1.5 V vs. $Li/Li^+$ for three PTCDA/Li batteries comprising 50 and 60 mg of electrochemically active material for the cathode. In order to obtain a complete lithiation of the PTCDA, the potential was maintained at 1.5 V for 3 hours (see FIG. 25(B)). The button cells were then disassembled and the prelithiated PTCDA self-standing electrodes were recovered to be assembled with self-standing graphite electrodes.

FIG. 26 presents the first charge and discharge results obtained at a constant current of C/24 recorded between 1.5 and 3.5 V vs. graphite for two prelithiated PTCDA/graphite LIBs. Due to the formation of a SEI on the graphite negative electrode, the specific capacity of the first charge was greater than the theoretical capacity of 137 $mAh \cdot g^{-1}$ for PTCDA and reached about 160 $mAh \cdot g^{-1}$. When the LIB was discharged, a small quantity of lithium was possibly irreversibly consumed by the graphite and capacities of only 104 and 108 $mAh \cdot g^{-1}$ were obtained for the positive electrodes comprising 50 mg of PTCDA and 60 mg of PTCDA, respectively. The long-term cycling results at C/10 for these LIBs are shown in FIG. 26(B). As observed for the graphite electrodes (see FIG. 23), a gradual capacity loss was observed during cycling for the complete PTCDA/graphite LIBs and may be mainly attributed to the consumption of lithium by the graphite negative electrode. A slight improvement can be observed with an increase in PTCDA loading due to the higher amount of available lithium.

Numerous modifications could be made to one or another of the embodiments described above without departing from the scope of the present invention as contemplated. Any references, patents or scientific literature documents referred to in the present application are incorporated herein by reference in their entirety for all purposes.

What is claimed is:

1. An electrode material comprising an electrochemically active material in the form of particles coated with a carbon layer in a core-shell configuration, wherein the surface of the carbon layer is grafted with at least one aryl group of Formula I:

Formula I

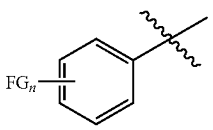

wherein:

FG is a hydrophilic functional group selected from a carboxylic acid and a sulfonic acid functional group; and n is an integer in the range of 1 to 5.

2. The electrode material of claim 1, wherein n is in the range of 1 to 3.

3. The electrode material of claim 2, wherein n is 1 or 2.

4. The electrode material of claim 3, wherein n is 1.

5. The electrode material of claim 1, wherein the particles are selected from metal oxide particles, lithiated metal oxide particles, metal phosphate particles, lithiated metal phosphate particles, carbon-based particles, and a combination of at least two thereof.

6. The electrode material of claim 5, wherein the metal is a transition metal selected from titanium (Ti), iron (Fe), manganese (Mn), vanadium (V), nickel (Ni), cobalt (Co), and a combination of at least two thereof.

7. The electrode material of claim 5, wherein the particles comprise lithiated iron phosphate ($LiFePO_4$) particles.

8. The electrode material of claim 5, wherein the particles comprise lithium titanate ($Li_4Ti_5O_{12}$) particles.

9. The electrode material of claim 1, further comprising an electronically conductive material selected from carbon black, acetylene black, graphite, graphene, carbon fibers, carbon nanofibers, carbon nanotubes, and a combination of at least two thereof.

10. The electrode material of claim 9, wherein the electronically conductive material comprises carbon fibers.

11. The electrode material of claim 10, wherein the carbon fibers are vapor grown carbon fibers (VGCFs).

12. The electrode material of claim 1, further comprising a binder comprising cellulose fibers.

13. A process for the manufacturing of an electrode material as defined in claim 1, the process comprising the following steps:

providing an electrochemically active material in the form of particles coated with a carbon layer in a core-shell configuration; and grafting at least one aryl group of Formula I on the surface of the carbon layer.

14. The process of claim 13, wherein the grafting step of the process comprises:

(i) generating an aryl diazonium ion by contacting an aniline of Formula II:

Formula II

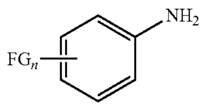

wherein:

FG and n are as defined in claim 1, with a diazotizing agent; and (ii) reacting the aryl diazonium ion generated in step (i) with the carbon of the carbon layer of the electrochemically active material.

15. The process of claim 14, wherein the diazotizing agent is present in a range of from 0.01 to 0.04 equivalent with respect to the carbon, or of about 0.03 equivalent with respect to the carbon.

16. The process of claim 14, wherein the diazotizing agent is present in a range of from 1 to 4 equivalents with respect to the aniline of Formula II, or of about 3 equivalents with respect to the aniline of Formula II.

17. The process of claim 14, wherein the diazotizing agent is a nitrite salt or an alkyl nitrite.

18. The process of claim 14, wherein the grafting step is carried out in an acidic aqueous medium or in a polar aprotic solvent.

19. The process of claim 14, wherein the aryl diazonium ion is generated in situ such that steps (i) and (ii) are performed simultaneously.

20. An electrode comprising an electrode material as defined in claim 1.

21. An electrochemical cell comprising a negative electrode, a positive electrode, and an electrolyte, wherein at least one of the negative and positive electrodes comprises an electrode material as defined in claim 1.

22. The electrochemical cell of claim 21, wherein the electrolyte is a liquid electrolyte comprising a lithium salt in a solvent, a gel electrolyte comprising a lithium salt in a solvent and/or a solvating polymer, or a solid polymer electrolyte comprising a lithium salt in a solvating polymer.

23. A battery comprising at least one electrochemical cell as defined in claim 21.

* * * * *